United States Patent
Rivard et al.

(10) Patent No.: US 10,785,401 B2
(45) Date of Patent: Sep. 22, 2020

(54) SYSTEMS AND METHODS FOR ADJUSTING FOCUS BASED ON FOCUS TARGET INFORMATION

(71) Applicant: Duelight LLC, Sunnyvale, CA (US)

(72) Inventors: William Guie Rivard, Menlo Park, CA (US); Brian J. Kindle, Sunnyvale, CA (US); Adam Barry Feder, Mountain View, CA (US)

(73) Assignee: DUELIGHT LLC, Sunnyvale, CA (US)

( * ) Notice: Subject to any disclaimer, the term of this patent is extended or adjusted under 35 U.S.C. 154(b) by 0 days.

(21) Appl. No.: 16/213,041

(22) Filed: Dec. 7, 2018

(65) Prior Publication Data

US 2019/0116306 A1 Apr. 18, 2019

Related U.S. Application Data

(63) Continuation of application No. 15/643,311, filed on Jul. 6, 2017, now Pat. No. 10,178,300, which is a (Continued)

(51) Int. Cl.
*H04N 5/232* (2006.01)
*H04N 5/235* (2006.01)
(Continued)

(52) U.S. Cl.
CPC ....... *H04N 5/23212* (2013.01); *H04N 5/2252* (2013.01); *H04N 5/2253* (2013.01);
(Continued)

(58) Field of Classification Search
CPC ............. H04N 5/23212; H04N 5/2356; H04N 5/23222; H04N 5/23219; H04N 5/23216;
(Continued)

(56) References Cited

U.S. PATENT DOCUMENTS 4,873,561 A 10/1989 Wen
5,200,828 A 4/1993 Jang et al.
(Continued)

FOREIGN PATENT DOCUMENTS

CN 101290388 A 10/2008
CN 101408709 A 4/2009
(Continued)

OTHER PUBLICATIONS

Corrected Notice of Allowance from U.S. Appl. No. 15/636,324, dated Sep. 5, 2019.
(Continued)

*Primary Examiner* — Abdelaaziz Tissire
(74) *Attorney, Agent, or Firm* — Zilka-Kotab, P.C.

(57) ABSTRACT

A system, method, and computer program product are provided for generating a focus sweep to produce a focus stack. In use, an image is sampled as image data. Next, a first focus region is identified and a second focus region is identified. Next, first focus target information corresponding to the first focus region is determined and second focus target information corresponding to the second focus region is determined. Further, a focus is adjusted, based on the first focus target information and at least one first image is captured based on the first focus target information. Additionally, the focus is adjusted, based on the second focus target information and at least one second image is captured based on the second focus target information. Lastly, the at least one first image and the at least one second image are saved to an image stack. Additional systems, methods, and computer program products are also presented.

20 Claims, 15 Drawing Sheets

Related U.S. Application Data continuation of application No. 15/254,964, filed on Sep. 1, 2016, now Pat. No. 10,270,958.

(51) Int. Cl.
  *H04N 5/225* (2006.01)
  *H04N 5/265* (2006.01)

(52) U.S. Cl.
  CPC ......... *H04N 5/2254* (2013.01); *H04N 5/2257* (2013.01); *H04N 5/2258* (2013.01); *H04N 5/2356* (2013.01); *H04N 5/23216* (2013.01); *H04N 5/23219* (2013.01); *H04N 5/23222* (2013.01); *H04N 5/265* (2013.01); *H04N 5/2256* (2013.01); *H04N 5/23232* (2013.01)

(58) Field of Classification Search
  CPC .... H04N 5/2258; H04N 5/265; H04N 5/2257; H04N 5/2254; H04N 5/2253; H04N 5/2252; H04N 5/23232; H04N 5/2256
  See application file for complete search history.

(56) References Cited

U.S. PATENT DOCUMENTS

| | | | |
|---|---|---|---|
| 5,363,209 A | 11/1994 | Eschbach et al. |
| 5,818,977 A | 10/1998 | Tansley |
| 5,867,215 A | 2/1999 | Kaplan |
| 6,115,065 A | 9/2000 | Yadid-Pecht et al. |
| 6,184,940 B1 | 2/2001 | Sano |
| 6,243,430 B1 | 6/2001 | Mathe |
| 6,365,950 B1 | 4/2002 | Sohn |
| 6,453,068 B1 | 9/2002 | Li |
| 6,498,926 B1 | 12/2002 | Ciccarelli et al. |
| 6,642,962 B1 | 11/2003 | Lin et al. |
| 6,788,338 B1 | 9/2004 | Dinev et al. |
| 6,996,186 B2 | 2/2006 | Ngai et al. |
| 7,084,905 B1 | 8/2006 | Nayar et al. |
| 7,088,351 B2 | 8/2006 | Wang |
| 7,098,952 B2 | 8/2006 | Morris et al. |
| 7,206,449 B2 | 4/2007 | Raskar et al. |
| 7,256,381 B2 | 8/2007 | Asaba |
| 7,265,784 B1 | 9/2007 | Frank |
| 7,518,645 B2 | 4/2009 | Farrier |
| 7,587,099 B2 | 9/2009 | Szeliski et al. |
| 7,599,569 B2 | 10/2009 | Smirnov et al. |
| 7,760,246 B2 | 7/2010 | Dalton et al. |
| 7,835,586 B2 | 11/2010 | Porikli |
| 7,907,791 B2 | 3/2011 | Kinrot et al. |
| 7,999,858 B2 | 8/2011 | Nayar et al. |
| 8,144,253 B2 | 3/2012 | Su et al. |
| 8,189,944 B1 | 5/2012 | Lim |
| 8,610,789 B1 | 12/2013 | Nayar et al. |
| 8,675,086 B1 | 3/2014 | Linzer |
| 8,723,284 B1 | 5/2014 | Hynecek |
| 8,761,245 B2 | 6/2014 | Puri et al. |
| 8,780,420 B1 | 7/2014 | Bluzer et al. |
| 8,811,757 B2 | 8/2014 | Batur |
| 8,854,421 B2 | 10/2014 | Kasahara |
| 8,878,963 B2 | 11/2014 | Prabhudesai et al. |
| 8,934,029 B2 | 1/2015 | Nayar et al. |
| 8,976,264 B2 | 3/2015 | Rivard et al. |
| 9,014,459 B2 | 4/2015 | Xiang et al. |
| 9,070,185 B2 | 6/2015 | Lee et al. |
| 9,083,905 B2 | 7/2015 | Wan et al. |
| 9,106,888 B2 | 8/2015 | Chou |
| 9,137,455 B1 | 9/2015 | Rivard et al. |
| 9,154,708 B1 | 10/2015 | Rivard et al. |
| 9,160,936 B1 | 10/2015 | Rivard et al. |
| 9,167,169 B1 | 10/2015 | Rivard et al. |
| 9,179,062 B1 | 11/2015 | Rivard et al. |
| 9,179,085 B1 | 11/2015 | Rivard et al. |
| 9,336,574 B2 | 5/2016 | Zhang et al. |
| 9,406,147 B2 | 8/2016 | Rivard et al. |
| 9,531,961 B2 | 12/2016 | Rivard et al. |
| 9,560,269 B2 | 1/2017 | Baldwin |
| 9,578,211 B2 | 2/2017 | Kong et al. |
| 9,600,741 B1 | 3/2017 | Su et al. |
| 9,661,327 B2 | 5/2017 | Nilsson |
| 9,807,322 B2 | 10/2017 | Feder et al. |
| 9,819,849 B1 | 11/2017 | Rivard et al. |
| 9,860,461 B2 | 1/2018 | Feder et al. |
| 9,912,928 B2 | 3/2018 | Rivard et al. |
| 9,918,017 B2 | 3/2018 | Rivard et al. |
| 9,998,721 B2 | 6/2018 | Rivard et al. |
| 10,110,870 B2 | 10/2018 | Rivard et al. |
| 10,129,514 B2 | 11/2018 | Rivard et al. |
| 10,178,300 B2 | 1/2019 | Rivard et al. |
| 10,182,197 B2 | 1/2019 | Feder et al. |
| 10,270,958 B2 | 4/2019 | Rivard et al. |
| 10,372,971 B2 | 8/2019 | Rivard et al. |
| 10,375,369 B2 | 8/2019 | Rivard et al. |
| 10,382,702 B2 | 8/2019 | Rivard et al. |
| 10,469,714 B2 | 11/2019 | Rivard et al. |
| 10,477,077 B2 | 11/2019 | Rivard et al. |
| 10,498,982 B2 | 12/2019 | Feder et al. |
| 10,558,848 B2 | 2/2020 | Rivard et al. |
| 10,586,097 B2 | 3/2020 | Rivard et al. |
| 10,652,478 B2 | 5/2020 | Rivard et al. |
| 2003/0015645 A1 | 1/2003 | Brickell et al. |
| 2003/0142745 A1 | 7/2003 | Osawa |
| 2004/0181375 A1 | 9/2004 | Szu et al. |
| 2004/0184677 A1 | 9/2004 | Raskar et al. |
| 2004/0252199 A1 | 12/2004 | Cheung et al. |
| 2004/0263510 A1 | 12/2004 | Marschner et al. |
| 2005/0088570 A1 | 4/2005 | Seo |
| 2005/0134723 A1 | 6/2005 | Lee et al. |
| 2006/0015308 A1 | 1/2006 | Marschner et al. |
| 2006/0050165 A1 | 3/2006 | Amano |
| 2006/0087702 A1 | 4/2006 | Satoh et al. |
| 2006/0181614 A1 | 8/2006 | Yen et al. |
| 2006/0245014 A1 | 11/2006 | Haneda |
| 2007/0023798 A1 | 2/2007 | McKee |
| 2007/0025714 A1 | 2/2007 | Shiraki |
| 2007/0025717 A1 | 2/2007 | Raskar et al. |
| 2007/0030357 A1 | 2/2007 | Levien et al. |
| 2007/0242900 A1 | 10/2007 | Chen et al. |
| 2007/0248342 A1 | 10/2007 | Tamminen et al. |
| 2007/0263106 A1 | 11/2007 | Tanaka et al. |
| 2008/0018763 A1 | 1/2008 | Sato |
| 2008/0030592 A1 | 2/2008 | Border et al. |
| 2008/0107411 A1 | 5/2008 | Hope |
| 2008/0151097 A1* | 6/2008 | Chen ...................... G02B 7/38 348/349 |
| 2008/0158398 A1 | 7/2008 | Yaffe et al. |
| 2008/0170160 A1 | 7/2008 | Lukac |
| 2008/0192064 A1 | 8/2008 | Hong et al. |
| 2009/0002475 A1 | 1/2009 | Jelley et al. |
| 2009/0066782 A1 | 3/2009 | Choi et al. |
| 2009/0153245 A1 | 6/2009 | Lee |
| 2009/0160992 A1 | 6/2009 | Inaba et al. |
| 2009/0175555 A1 | 7/2009 | Mahowald |
| 2009/0295941 A1 | 12/2009 | Nakajima et al. |
| 2009/0309990 A1 | 12/2009 | Levoy et al. |
| 2009/0309994 A1 | 12/2009 | Inoue |
| 2009/0322903 A1 | 12/2009 | Hashimoto et al. |
| 2010/0073499 A1 | 3/2010 | Gere |
| 2010/0118204 A1 | 5/2010 | Proca et al. |
| 2010/0165178 A1 | 7/2010 | Chou et al. |
| 2010/0165181 A1 | 7/2010 | Murakami et al. |
| 2010/0182465 A1 | 7/2010 | Okita |
| 2010/0194851 A1 | 8/2010 | Pasupaleti et al. |
| 2010/0194963 A1 | 8/2010 | Terashima |
| 2010/0201831 A1 | 8/2010 | Weinstein |
| 2010/0208099 A1 | 8/2010 | Nomura |
| 2010/0231747 A1 | 9/2010 | Yim |
| 2010/0265079 A1 | 10/2010 | Yin |
| 2010/0302407 A1 | 12/2010 | Ayers et al. |
| 2011/0019051 A1 | 1/2011 | Yin et al. |
| 2011/0090385 A1 | 4/2011 | Aoyama et al. |
| 2011/0096192 A1 | 4/2011 | Niikura |
| 2011/0115971 A1 | 5/2011 | Furuya et al. |
| 2011/0134267 A1 | 6/2011 | Ohya |
| 2011/0150332 A1 | 6/2011 | Sibiryakov et al. |

(56) References Cited

U.S. PATENT DOCUMENTS

| | | |
|---|---|---|
| 2011/0194618 A1 | 8/2011 | Gish et al. |
| 2011/0242334 A1 | 10/2011 | Wilburn et al. |
| 2011/0279698 A1 | 11/2011 | Yoshikawa |
| 2011/0280541 A1 | 11/2011 | Lee |
| 2012/0002082 A1 | 1/2012 | Johnson et al. |
| 2012/0002089 A1 | 1/2012 | Wang et al. |
| 2012/0008011 A1 | 1/2012 | Garcia Manchado |
| 2012/0033118 A1 | 2/2012 | Lee et al. |
| 2012/0057786 A1* | 3/2012 | Yano .................. H04N 5/232 382/170 |
| 2012/0069213 A1 | 3/2012 | Jannard et al. |
| 2012/0154541 A1 | 6/2012 | Scott |
| 2012/0154627 A1 | 6/2012 | Rivard et al. |
| 2012/0162465 A1 | 6/2012 | Culbert et al. |
| 2012/0177352 A1 | 7/2012 | Pillman et al. |
| 2012/0188392 A1 | 7/2012 | Smith |
| 2012/0206582 A1 | 8/2012 | DiCarlo et al. |
| 2012/0212661 A1 | 8/2012 | Yamaguchi et al. |
| 2012/0242844 A1 | 9/2012 | Walker et al. |
| 2012/0262600 A1 | 10/2012 | Velarde et al. |
| 2012/0274806 A1 | 11/2012 | Mori |
| 2012/0287223 A1 | 11/2012 | Zhang et al. |
| 2012/0314100 A1 | 12/2012 | Frank |
| 2013/0010075 A1 | 1/2013 | Gallagher et al. |
| 2013/0021447 A1 | 1/2013 | Brisedoux et al. |
| 2013/0027580 A1 | 1/2013 | Olsen et al. |
| 2013/0050520 A1 | 2/2013 | Takeuchi |
| 2013/0070145 A1* | 3/2013 | Matsuyama ....... H04N 5/23216 348/333.12 |
| 2013/0107062 A1 | 5/2013 | Okazaki |
| 2013/0114894 A1 | 5/2013 | Yadav et al. |
| 2013/0147979 A1 | 6/2013 | McMahon et al. |
| 2013/0148013 A1 | 6/2013 | Shiohara |
| 2013/0176458 A1 | 7/2013 | Van Dalen et al. |
| 2013/0194963 A1 | 8/2013 | Hampel |
| 2013/0223530 A1 | 8/2013 | Demos |
| 2013/0228673 A1 | 9/2013 | Hashimoto et al. |
| 2013/0235068 A1 | 9/2013 | Ubillos et al. |
| 2013/0271631 A1 | 10/2013 | Tatsuzawa et al. |
| 2013/0279584 A1 | 10/2013 | Demos |
| 2013/0293744 A1 | 11/2013 | Attar et al. |
| 2013/0301729 A1 | 11/2013 | Demos |
| 2013/0335596 A1 | 12/2013 | Demandolx et al. |
| 2013/0342526 A1* | 12/2013 | Ng .................. G06T 15/205 345/419 |
| 2013/0342740 A1 | 12/2013 | Govindarao |
| 2014/0009636 A1* | 1/2014 | Lee .................. H04N 5/23212 348/222.1 |
| 2014/0063287 A1 | 3/2014 | Yamada |
| 2014/0063301 A1 | 3/2014 | Solhusvik |
| 2014/0098248 A1 | 4/2014 | Okazaki |
| 2014/0168468 A1 | 6/2014 | Levoy et al. |
| 2014/0176757 A1 | 6/2014 | Rivard et al. |
| 2014/0184894 A1 | 7/2014 | Motta |
| 2014/0192216 A1 | 7/2014 | Matsumoto |
| 2014/0192267 A1 | 7/2014 | Biswas et al. |
| 2014/0193088 A1 | 7/2014 | Capata et al. |
| 2014/0198242 A1 | 7/2014 | Weng et al. |
| 2014/0211852 A1 | 7/2014 | Demos |
| 2014/0244858 A1 | 8/2014 | Okazaki |
| 2014/0247979 A1 | 9/2014 | Roffet et al. |
| 2014/0267869 A1 | 9/2014 | Sawa |
| 2014/0300795 A1 | 10/2014 | Bilcu et al. |
| 2014/0301642 A1 | 10/2014 | Muninder |
| 2014/0354781 A1* | 12/2014 | Matsuyama ....... H04N 5/23212 348/49 |
| 2015/0005637 A1 | 1/2015 | Stegman et al. |
| 2015/0077581 A1 | 3/2015 | Baltz et al. |
| 2015/0092852 A1 | 4/2015 | Demos |
| 2015/0098651 A1 | 4/2015 | Rivard et al. |
| 2015/0103192 A1 | 4/2015 | Venkatraman et al. |
| 2015/0138366 A1 | 5/2015 | Keelan et al. |
| 2015/0222809 A1 | 8/2015 | Osuka et al. |
| 2015/0229819 A1 | 8/2015 | Rivard et al. |
| 2015/0279113 A1 | 10/2015 | Knorr et al. |
| 2015/0334318 A1 | 11/2015 | Georgiev et al. |
| 2015/0341593 A1 | 11/2015 | Zhang et al. |
| 2016/0028948 A1* | 1/2016 | Omori ................ H04N 5/23229 348/239 |
| 2016/0065926 A1 | 3/2016 | Nonaka et al. |
| 2016/0071289 A1 | 3/2016 | Kobayashi et al. |
| 2016/0086318 A1 | 3/2016 | Hannuksela et al. |
| 2016/0142610 A1 | 5/2016 | Rivard et al. |
| 2016/0150147 A1 | 5/2016 | Shioya |
| 2016/0150175 A1 | 5/2016 | Hynecek |
| 2016/0219211 A1 | 7/2016 | Katayama |
| 2016/0248968 A1 | 8/2016 | Baldwin |
| 2016/0284065 A1 | 9/2016 | Cohen |
| 2016/0316154 A1 | 10/2016 | Elmfors et al. |
| 2016/0323518 A1 | 11/2016 | Rivard et al. |
| 2016/0381304 A9 | 12/2016 | Feder et al. |
| 2017/0048442 A1 | 2/2017 | Cote et al. |
| 2017/0054966 A1 | 2/2017 | Zhou et al. |
| 2017/0061234 A1 | 3/2017 | Lim et al. |
| 2017/0061236 A1 | 3/2017 | Pope |
| 2017/0061567 A1 | 3/2017 | Lim et al. |
| 2017/0064192 A1 | 3/2017 | Mori |
| 2017/0064227 A1 | 3/2017 | Lin et al. |
| 2017/0064276 A1 | 3/2017 | Rivard et al. |
| 2017/0070690 A1 | 3/2017 | Feder et al. |
| 2017/0076430 A1 | 3/2017 | Xu |
| 2017/0085785 A1 | 3/2017 | Corcoran et al. |
| 2017/0302903 A1 | 10/2017 | Ng et al. |
| 2017/0374336 A1 | 12/2017 | Rivard et al. |
| 2018/0007240 A1 | 1/2018 | Rivard et al. |
| 2018/0063409 A1 | 3/2018 | Rivard et al. |
| 2018/0063411 A1 | 3/2018 | Rivard et al. |
| 2018/0077367 A1 | 3/2018 | Feder et al. |
| 2018/0160092 A1 | 6/2018 | Rivard et al. |
| 2018/0183989 A1 | 6/2018 | Rivard et al. |
| 2019/0045165 A1 | 2/2019 | Rivard et al. |
| 2019/0108387 A1 | 4/2019 | Rivard et al. |
| 2019/0108388 A1 | 4/2019 | Rivard et al. |
| 2019/0124280 A1 | 4/2019 | Feder et al. |
| 2019/0174028 A1 | 6/2019 | Rivard et al. |
| 2019/0197297 A1 | 6/2019 | Rivard et al. |
| 2019/0335151 A1 | 10/2019 | Rivard et al. |
| 2019/0349510 A1 | 11/2019 | Rivard et al. |
| 2020/0029008 A1 | 1/2020 | Rivard et al. |
| 2020/0059575 A1 | 2/2020 | Rivard et al. |
| 2020/0084398 A1 | 3/2020 | Feder et al. |
| 2020/0193144 A1 | 6/2020 | Rivard et al. |

FOREIGN PATENT DOCUMENTS

| | | |
|---|---|---|
| CN | 102053453 A | 5/2011 |
| CN | 103152519 A | 6/2013 |
| CN | 103813098 A | 5/2014 |
| CN | 204316606 U | 5/2015 |
| CN | 105026955 A | 11/2015 |
| DE | 102011107844 A1 | 1/2013 |
| EP | 2169946 A2 | 3/2010 |
| EP | 2346079 A1 | 7/2011 |
| EP | 2731326 A2 | 5/2014 |
| GB | 2486878 A | 7/2012 |
| GB | 2487943 A | 8/2012 |
| JP | 2000278532 A | 10/2000 |
| JP | 2002112008 A | 4/2002 |
| JP | 2003101886 A | 4/2003 |
| JP | 2004247983 A | 9/2004 |
| JP | 2004248061 A | 9/2004 |
| JP | 2004326119 A | 11/2004 |
| JP | 2004328532 A | 11/2004 |
| JP | 2006080752 A | 3/2006 |
| JP | 2006121612 A | 5/2006 |
| JP | 2007035028 A | 2/2007 |
| JP | 2008236726 A | 10/2008 |
| JP | 2009267923 A | 11/2009 |
| JP | 2009303010 A | 12/2009 |
| JP | 2010016416 A | 1/2010 |
| JP | 2010136224 A | 6/2010 |
| JP | 2010239317 A | 10/2010 |
| JP | 4649623 B2 | 3/2011 |

(56) References Cited

FOREIGN PATENT DOCUMENTS

| | | | |
|---|---|---|---|
| JP | 2011097141 A | 5/2011 | |
| JP | 2011101180 A | 5/2011 | |
| JP | 2011120094 A | 6/2011 | |
| JP | 2011146957 A | 7/2011 | |
| JP | 2012156885 A | 8/2012 | |
| JP | 2012195660 A | 10/2012 | |
| JP | 2013066142 A | 4/2013 | |
| JP | 2013120254 A | 6/2013 | |
| JP | 2013207327 A | 10/2013 | |
| JP | 2013219708 A | 10/2013 | |
| JP | 2013258444 A | 12/2013 | |
| JP | 2013258510 A | 12/2013 | |
| JP | 2014057256 A | 3/2014 | |
| JP | 2014140247 A | 7/2014 | |
| JP | 2014142836 A | 8/2014 | |
| JP | 2014155033 A | 8/2014 | |
| KR | 20100094200 A | 8/2010 | |
| WO | 9746001 A1 | 12/1997 | |
| WO | 0237830 A2 | 5/2002 | |
| WO | 2004064391 A1 | 7/2004 | |
| WO | 2008010559 A1 | 1/2008 | |
| WO | 2009074938 A2 | 6/2009 | |
| WO | 2014172059 A2 | 10/2014 | |
| WO | 2015123455 A1 | 8/2015 | |
| WO | 2015173565 A1 | 11/2015 | |

OTHER PUBLICATIONS

Corrected Notice of Allowance from U.S. Appl. No. 16/271,604, dated Sep. 19, 2019.
Non-Final Office Action for U.S. Appl. No. 16/519,244, dated Sep. 23, 2019.
Corrected Notice of Allowance from U.S. Appl. No. 16/217,848, dated Sep. 24, 2019.
Examination Report from European Application No. 15 856 814.7, dated Aug. 20, 2019.
Examination Report from European Application No. 15 857 675.1, dated Aug. 23, 2019.
Examination Report from European Application No. 15 856 710.7, dated Sep. 09, 2019.
Examination Report from European Application No. 15 857 386.5, dated Sep. 17, 2019.
Examination Report from European Application No. 15 857 748.6, dated Sep. 26, 2019.
Rivard et al., U.S. Appl. No. 16/584,486, filed Sep. 26, 2019.
Notice of Allowance from U.S. Appl. No. 13/573,252, dated Oct. 22, 2014.
Non-Final Office Action from U.S. Appl. No. 13/573,252, dated Jul. 10, 2014.
Rivard, W. et al., U.S. Appl. No. 14/568,045, filed Dec. 11, 2014.
Restriction Requirement from U.S. Appl. No. 14/568,045, dated Jan. 15, 2015.
Rivard, W. et al., U.S. Appl. No. 14/534,068, filed Nov. 5, 2014.
Non-Final Office Action from U.S. Appl. No. 14/534,068, dated Feb. 17, 2015.
Feder et al., U.S. Appl. No. 13/999,678, filed Mar. 14, 2014.
Rivard, W. et al., U.S. Appl. No. 14/534,079, filed Nov. 5, 2014.
Non-Final Office Action from U.S. Appl. No. 14/534,079, dated Jan. 29, 2015.
Rivard, W. et al., U.S. Appl. No. 14/534,089, filed Nov. 5, 2014.
Non-Final Office Action from U.S. Appl. No. 14/534,089, dated Feb. 25, 2015.
Rivard, W. et al., U.S. Appl. No. 14/535,274, filed Nov. 6, 2014.
Non-Final Office Action from U.S. Appl. No. 14/535,274, dated Feb. 3, 2015.
Rivard, W. et al., U.S. Appl. No. 14/535,279, filed Nov. 6, 2014.
Non-Final Office Action from U.S. Appl. No. 14/535,279, dated Ferb. 5, 2015.
Rivard, W. et al., U.S. Appl. No. 14/535,282, filed Nov. 6, 2014.
Non-Final Office Action from U.S. Appl. No. 14/535,282, dated Jan. 30, 2015.
Non-Final Office Action from U.S. Appl. No. 14/536,524, dated Mar. 3, 2015.
Rivard, W. et al., U.S. Appl. No. 14/536,524, Nov. 7, 2014.
Non-Final Office Action from U.S. Appl. No. 14/568,045, dated Mar. 24, 2015.
Rivard, W. et al., U.S. Appl. No. 14/702,549, filed May 1, 2015.
Notice of Allowance from U.S. Appl. No. 14/534,079, dated May 11, 2015.
Notice of Allowance from U.S. Appl. No. 14/535,274, dated May 26, 2015.
Notice of Allowance from U.S. Appl. No. 14/534,089, dated Jun. 23, 2015.
Notice of Allowance from U.S. Appl. No. 14/535,282, dated Jun. 23, 2015.
Notice of Allowance from U.S. Appl. No. 14/536,524, dated Jun. 29, 2015.
Notice of Allowance from U.S. Appl. No. 14/534,068, dated Jul. 29, 2015.
Notice of Allowance from U.S. Appl. No. 14/535,279, dated Aug. 31, 2015.
Final Office Action from U.S. Appl. No. 14/568,045, dated Sep. 18, 2015.
Non-Final Office Action from U.S. Appl. No. 13/999,678, dated Aug. 12, 2015.
International Search Report and Written Opinion from International Application No. PCT/US15/59348, dated Feb. 2, 2016.
International Search Report and Written Opinion from International Application No. PCT/US15/59097, dated Jan. 4, 2016.
Non-Final Office Action from U.S. Appl. No. 14/702,549, dated Jan. 25, 2016.
Final Office Action from U.S. Appl. No. 13/999,678, dated Mar. 28, 2016.
International Search Report and Written Opinion from International Application No. PCT/US2015/060476, dated Feb. 10, 2016.
Notice of Allowance from U.S. Appl. No. 14/568,045, dated Apr. 26, 2016.
International Search Report and Written Opinion from International Application No. PCT/US2015/058895, dated Apr. 11, 2016.
Notice of Allowance from U.S. Appl. No. 14/568,045, dated Jan. 12, 2016.
International Search Report and Written Opinion from International Application No. PCT/US2015/059103, dated Dec. 21, 2015.
Final Office Action from U.S. Appl. No. 14/178,305, dated May 18, 2015.
Non-Final Office Action from U.S. Appl. No. 14/178,305, dated Aug. 11, 2014.
Non-Final Office Action from U.S. Appl. No. 14/823,993, dated Jul. 28, 2016.
International Search Report and Written Opinion from International Application No. PCT/US2015/059105, dated Jul. 26, 2016.
Notice of Allowance from U.S. Appl. No. 14/702,549, dated Aug. 15, 2016.
International Search Report and Written Opinion from International Application No. PCT/US2015/058896, dated Aug. 26, 2016.
International Search Report and Written Opinion from International Application No. PCT/US2015/058891, dated Aug. 26, 2016.
International Search Report and Written Opinion from International Application No. PCT/US2016/050011, dated Nov. 10, 2016.
Final Office Action from U.S. Appl. No. 14/823,993, dated Feb. 10, 2017.
Non-Final Office Action from U.S. Appl. No. 15/354,935, dated Feb. 8, 2017.
Non-Final Office Action from U.S. Appl. No. 13/999,678, dated Dec. 20, 2016.
International Search Report and Written Opinion from International Application No. PCT/US 18/54014, dated Dec. 26, 2018.
Rivard et al., U.S. Appl. No. 16/290,763, filed Mar. 1, 2019.
Supplemental Notice of Allowance for U.S. Appl. No. 15/254,964, dated Mar. 11, 2019.
Rivard, W. et al., U.S. Appl. No. 15/976,756, filed May 10, 2018.

(56) References Cited

OTHER PUBLICATIONS

Final Office Action for U.S. Appl. No. 15/636,324, dated Mar. 22, 2019.
Wan et al., "CMOS Image Sensors With Multi-Bucket Pixels for Computational Photography," IEEE Journal of Solid-State Circuits, vol. 47, No. 4, Apr. 2012, pp. 1031-1042.
Notice of Allowance from U.S. Appl. No. 15/201,283, dated Mar. 23, 2017.
Chatterjee et al., "Clustering-Based Denoising With Locally Learned Dictionaries," IEEE Transactions on Image Processing, vol. 18, No. 7, Jul. 2009, pp. 1-14.
Burger et al., "Image denoising: Can plain Neural Networks compete with BM3D?," Computer Vision and Pattern Recognition (CVPR), IEEE, 2012, pp. 4321-4328.
Kervann et al., "Optimal Spatial Adaptation for Patch-Based Image Denoising," IEEE Transactions on Image Processing, vol. 15, No. 10, Oct. 2006, pp. 2866-2878.
Foi et al., "Practical Poissonian-Gaussian noise modeling and fitting for single-image raw-data," IEEE Transactions, 2007, pp. 1-18.
International Search Report and Written Opinion from PCT Application No. PCT/US17/39946, dated Sep. 25, 2017.
Notice of Allowance from U.S. Appl. No. 15/201,283, dated Jul. 19, 2017.
Notice of Allowance from U.S. Appl. No. 15/354,935, dated Aug. 23, 2017.
Notice of Allowance from U.S. Appl. No. 14/823,993, dated Oct. 31, 2017.
Notice of Allowance from U.S. Appl. No. 15/352,510, dated Oct. 17, 2017.
European Office Communication and Exam Report from European Application No. 15856814.7, dated Dec. 14, 2017.
Supplemental Notice of Allowance from U.S. Appl. No. 15/354,935, dated Dec. 1, 2017.
European Office Communication and Exam Report from European Application No. 15856267.8, dated Dec. 12, 2017.
European Office Communication and Exam Report from European Application No. 15856710.7, dated Dec. 21, 2017.
European Office Communication and Exam Report from European Application No. 15857675.1, dated Dec. 21, 2017.
European Office Communication and Exam Report from European Application No. 15856212.4, dated Dec. 15, 2017.
Non-Final Office Action from U.S. Appl. No. 15/254,964, dated Jan. 3, 2018.
Non-Final Office Action from U.S. Appl. No. 15/643,311, dated Jan. 4, 2018.
European Office Communication and Exam Report from European Application No. 15857386.5, dated Jan. 11, 2018.
Kim et al., "A CMOS Image Sensor Based on Unified Pixel Architecture With Time-Division Multiplexing Scheme for Color and Depth Image Acquisition," IEEE Journal of Solid-State Circuits, vol. 47, No. 11, Nov. 2012, pp. 2834-2845.
European Office Communication and Exam Report from European Application No. 15857748.6, dated Jan. 10, 2018.
Non-Final Office Action from U.S. Appl. No. 15/814,238, dated Feb. 8, 2018.
Non-Final Office Action for U.S. Appl. No. 15/687,278, dated Apr. 13, 2018.
Non-Final Office Action from U.S. Appl. No. 15/836,655, dated Apr. 6, 2018.
Notice of Allowance from U.S. Appl. No. 15/836,655, dated Apr. 30, 2018.
Rivard, W. et al., U.S. Appl. No. 15/891,251, filed Feb. 7, 2018.
Rivard et al., U.S. Appl. No. 14/823,993, filed Aug. 11, 2015.
Rivard et al., U.S. Appl. No. 14/536,524, filed Nov. 7, 2014.
Extended European Search Report from European Application No. 15891394.7 dated Jun. 19, 2018.
Non-Final Office Action for U.S. Appl. No. 15/885,296, dated Jun. 4, 2018.
Non-Final Office Action for U.S. Appl. No. 15/891,251, dated May 31, 2018.
Notice of Allowance from U.S. Appl. No. 15/687,278, dated Aug. 24, 2018.
Final Office Action for U.S. Appl. No. 15/643,311 dated Jul. 24, 2018.
Notice of Allowance for U.S. Appl. No. 15/885,296 dated Sep. 21, 2018.
Final Office Action for U.S. Appl. No. 15/254,964 dated Jul. 24, 2018.
Notice of Allowance for U.S. Appl. No. 15/814,238 dated Oct. 4, 2018.
Corrected Notice of Allowance for U.S. Appl. No. 15/885,296 dated Oct. 16, 2018.
Rivard et al., U.S. Appl. No. 16/154,999, filed Oct. 9, 2018.
Non-Final Office Action for U.S. Appl. No. 15/636,324, dated Oct. 18, 2018.
Notice of Allowance for U.S. Appl. No. 15/643,311, dated Oct. 31, 2018.
Corrected Notice of Allowance for U.S. Appl. No. 15/814,238 dated Nov. 13, 2018.
Final Office Action for U.S. Appl. No. 15/891,251, dated Nov. 29, 2018.
Rivard et al., U.S. Appl. No. 16/215,351, filed Dec. 10, 2018.
Rivard et al., U.S. Appl. No. 16/213,041, filed Dec. 7, 2018.
Non-Final Office Action for U.S. Appl. No. 16/154,999, dated Dec. 20, 2018.
Notice of Allowance for U.S. Appl. No. 15/254,964, dated Dec. 21, 2018.
Supplemental Notice of Allowance for U.S. Appl. No. 15/643,311, dated Dec. 11, 2018.
Rivard et al., U.S. Appl. No. 16/505,278, filed Jul. 8, 2019.
Rivard et al., U.S. Appl. No. 16/519,244, filed Jul. 23, 2019.
Notice of Allowance from U.S. Appl. No. 16/217,848, dated Jul. 31, 2019.
Corrected Notice of Allowance from U.S. Appl. No. 16/271,604, dated Aug. 8, 2019.
Corrected Notice of Allowance from U.S. Appl. No. 15/636,324, dated Aug. 20, 2019.
Notice of Allowance from U.S. Appl. No. 15/891,251, dated May 7, 2019.
Notice of Allowance from U.S. Appl. No. 16/154,999, dated Jun. 7, 2019.
Corrected Notice of Allowance from U.S. Appl. No. 15/891,251, dated Jul. 3, 2019.
Notice of Allowance from U.S. Appl. No. 15/636,324, dated Jul. 2, 2019.
Notice of Allowance from U.S. Appl. No. 16/271,604, dated Jul. 2, 2019.
Non-Final Office Action for U.S. Appl. No. 15/976,756, dated Jun. 27, 2019.
Non-Final Office Action for U.S. Appl. No. 16/290,763, dated Jun. 26, 2019.
Non-Final Office Action from U.S. Appl. No. 16/271,604, dated Apr. 5, 2019.
Notice of Allowance from U.S. Appl. No. 16/215,351, dated Apr. 1, 2019.
Rivard et al., U.S. Appl. No. 16/271,604, filed Feb. 8, 2019.
Non-Final Office Action for U.S. Appl. No. 15/636,324, dated Apr. 18, 2019.
Non-Final Office Action from U.S. Appl. No. 14/535,279, dated Feb. 5, 2015.
Feder et al., U.S. Appl. No. 16/217,848, filed Dec. 12, 2018.
International Preliminary Examination Report from PCT Application No. PCT/US2017/39946, dated Jan. 10, 2019.
International Preliminary Examination Report from PCT Application No. PCT/US 18/54014, dated Dec. 26, 2018.
Non-Final Office Action from U.S. Appl. No. 16/215,351, dated Jan. 24, 2019.
Supplemental Notice of Allowance for U.S. Appl. No. 15/254,964, dated Feb. 1, 2019.
Notice of Allowance from U.S. Appl. No. 15/976,756, dated Oct. 4, 2019.
Notice of Allowance from U.S. Appl. No. 16/290,763, dated Oct. 10, 2019.

(56) References Cited

OTHER PUBLICATIONS

Corrected Notice of Allowance from U.S. Appl. No. 16/217,848, dated Oct. 31, 2019.
Office Action from Japanese Patent Application No. 2017-544279, dated Oct. 23, 2019.
Office Action from Japanese Patent Application No. 2017-544280, dated Oct. 29, 2019.
Office Action from Japanese Patent Application No. 2017-544283, dated Oct. 29, 2019.
Office Action from Japanese Patent Application No. 2017-544547, dated Nov. 05, 2019.
Rivard et al., U.S. Appl. No. 16/662,965, filed Oct. 24, 2019.
Office Action from Japanese Patent Application No. 2017-544281, dated Nov. 26, 2019.
Extended European Search Report from European Application No. 16915389.7, dated Dec. 2, 2019.
Office Action from Japanese Patent Application No. 2017-544284, dated Dec. 10, 2019.
Feder et al., U.S. Appl. No. 16/684,389, filed Nov. 14, 2019.
Non-Final Office Action for U.S. Appl. No. 16/505,278, dated Jan. 10, 2020.
Notice of Allowance from U.S. Appl. No. 16/519,244, dated Jan. 14, 2020.
Office Action from Japanese Patent Application No. 2017-544282, dated Jan. 7, 2020.
Office Action from Chinese Patent Application No. 201780053926.9, dated Jan. 16, 2020.
Rivard et al., U.S. Appl. No. 16/796,497, filed Feb. 20, 2020.
Corrected Notice of Allowance from U.S. Appl. No. 16/519,244, dated Feb. 20, 2020.
Extended European Search Report from European Application No. 17821236.1, dated Jan. 24, 2020.
Petschnigg et al., "Digital Photography with Flash and No-Flash Image Pairs," ACM Transactions of Graphics, vol. 23, Aug. 2004, pp. 664-672.
International Preliminary Examination Report from PCT Application No. PCT/US2018/054014, dated Apr. 16, 2020.
Office Action from Chinese Patent Application No. 201680088945.0, dated May 21, 2020.
Corrected Notice of Allowance from U.S. Appl. No. 16/519,244, dated Apr. 9, 2020.
Rivard et al., U.S. Appl. No. 16/857,016, filed Apr. 23, 2020.
Non-Final Office Action for U.S. Appl. No. 16/857,016, dated Aug. 5, 2020.

* cited by examiner

SYSTEMS AND METHODS FOR ADJUSTING FOCUS BASED ON FOCUS TARGET INFORMATION

RELATED APPLICATIONS

The present application is a continuation of, and claims priority to U.S. patent application Ser. No. 15/643,311, titled "SYSTEMS AND METHODS FOR ADJUSTING FOCUS BASED ON FOCUS TARGET INFORMATION," filed Jul. 6, 2017, which in turn claims priority to U.S. patent application Ser. No. 15/254,964, titled "SYSTEMS AND METHODS FOR ADJUSTING FOCUS BASED ON FOCUS TARGET INFORMATION," filed Sep. 1, 2016. The foregoing applications and/or patents are herein incorporated by reference in their entirety for all purposes.

This application is related to the following U.S. patent application, the entire disclosures being incorporated by reference herein: application Ser. No. 13/573,252 (DUELP003/DL001), now U.S. Pat. No. 8,976,264, filed Sep. 4, 2012, entitled "COLOR BALANCE IN DIGITAL PHOTOGRAPHY"; application Ser. No. 14/568,045, now U.S. Pat. No. 9,406,147 (DUELP003A/DL001A), filed Dec. 11, 2014, entitled "COLOR BALANCE IN DIGITAL PHOTOGRAPHY"; application Ser. No. 14/534,068 (DUELP005/DL011), now U.S. Pat. No. 9,167,174, filed Nov. 5, 2014, entitled "SYSTEMS AND METHODS FOR HIGH-DYNAMIC RANGE IMAGES"; application Ser. No. 14/534,079 (DUELP007/DL014), now U.S. Pat. No. 9,137,455 filed Nov. 5, 2014, entitled "IMAGE SENSOR APPARATUS AND METHOD FOR OBTAINING MULTIPLE EXPOSURES WITH ZERO INTERFRAME TIME"; application Ser. No. 14/534,089 (DUELP008/DL015), now U.S. Pat. No. 9,167,169, filed Nov. 5, 2014, entitled "IMAGE SENSOR APPARATUS AND METHOD FOR SIMULTANEOUSLY CAPTURING MULTIPLE IMAGES"; application Ser. No. 14/535,274 (DUELP009/DL016), now U.S. Pat. No. 9,154,708, filed Nov. 6, 2014, entitled "IMAGE SENSOR APPARATUS AND METHOD FOR SIMULTANEOUSLY CAPTURING FLASH AND AMBIENT ILLUMINATED IMAGES"; application Ser. No. 14/535,279 (DUELP010/DL017), now U.S. Pat. No. 9,179,085, filed Nov. 6, 2014, entitled "IMAGE SENSOR APPARATUS AND METHOD FOR OBTAINING LOW-NOISE, HIGH-SPEED CAPTURES OF A PHOTOGRAPHIC SCENE"; application Ser. No. 14/536,524 (DUELP012/DL019), now U.S. Pat. No. 9,160,936, filed Nov. 7, 2014, entitled "SYSTEMS AND METHODS FOR GENERATING A HIGH-DYNAMIC RANGE (HDR) PIXEL STREAM"; application Ser. No. 13/999,343 (DUELP021/DL007), now U.S. Pat. No. 9,215,433, filed Feb. 11, 2014, entitled "SYSTEMS AND METHODS FOR DIGITAL PHOTOGRAPHY"; application Ser. No. 14/887,211 (DUELP021A/DL007A), filed Oct. 19, 2015, entitled "SYSTEMS AND METHODS FOR DIGITAL PHOTOGRAPHY"; application Ser. No. 13/999,678 (DUELP022/DL008), filed Mar. 14, 2014, entitled "SYSTEMS AND METHODS FOR A DIGITAL IMAGE SENSOR"; and application Ser. No. 15/201,283 (DUELP024/DL027), filed Jul. 1, 2016, entitled "SYSTEMS AND METHODS FOR CAPTURING DIGITAL IMAGES".

FIELD OF THE INVENTION

The present invention relates to digital photographic systems, and more particularly to systems and methods for adjusting focus based on focus target information.

BACKGROUND

Traditional digital photography systems are inherently limited in how to change the focus of a camera module. One solution is to rely on software solutions (e.g. as found within a system on a chip) to send a focus signal to focus a lens assembly associated with the camera module. For example, an image sensor associated with a camera module may communicate with a system on a chip, which may evaluate the focus at a given point and send the focus signal (e.g. servo signal) back to the camera module to adjust one or more lenses within the lens assembly into a position that focuses an inbound image at the point. However, such an approach can be cumbersome and time consuming, and in some instances, the delay time associated with focusing at an indicated point may be noticeably slow.

There is thus a need for addressing these and/or other issues associated with the prior art.

SUMMARY

A system, method, and computer program product are provided for generating a focus sweep to produce a focus stack. In use, an image is sampled as image data. Next, a first focus region is identified and a second focus region is identified. Next, first focus target information corresponding to the first focus region is determined and second focus target information corresponding to the second focus region is determined. Further, a focus is adjusted, based on the first focus target information and at least one first image is captured based on the first focus target information. Additionally, the focus is adjusted, based on the second focus target information and at least one second image is captured based on the second focus target information. Lastly, the at least one first image and the at least one second image are saved to an image stack. Additional systems, methods, and computer program products are also presented.

DETAILED DESCRIPTION

Figure 1:
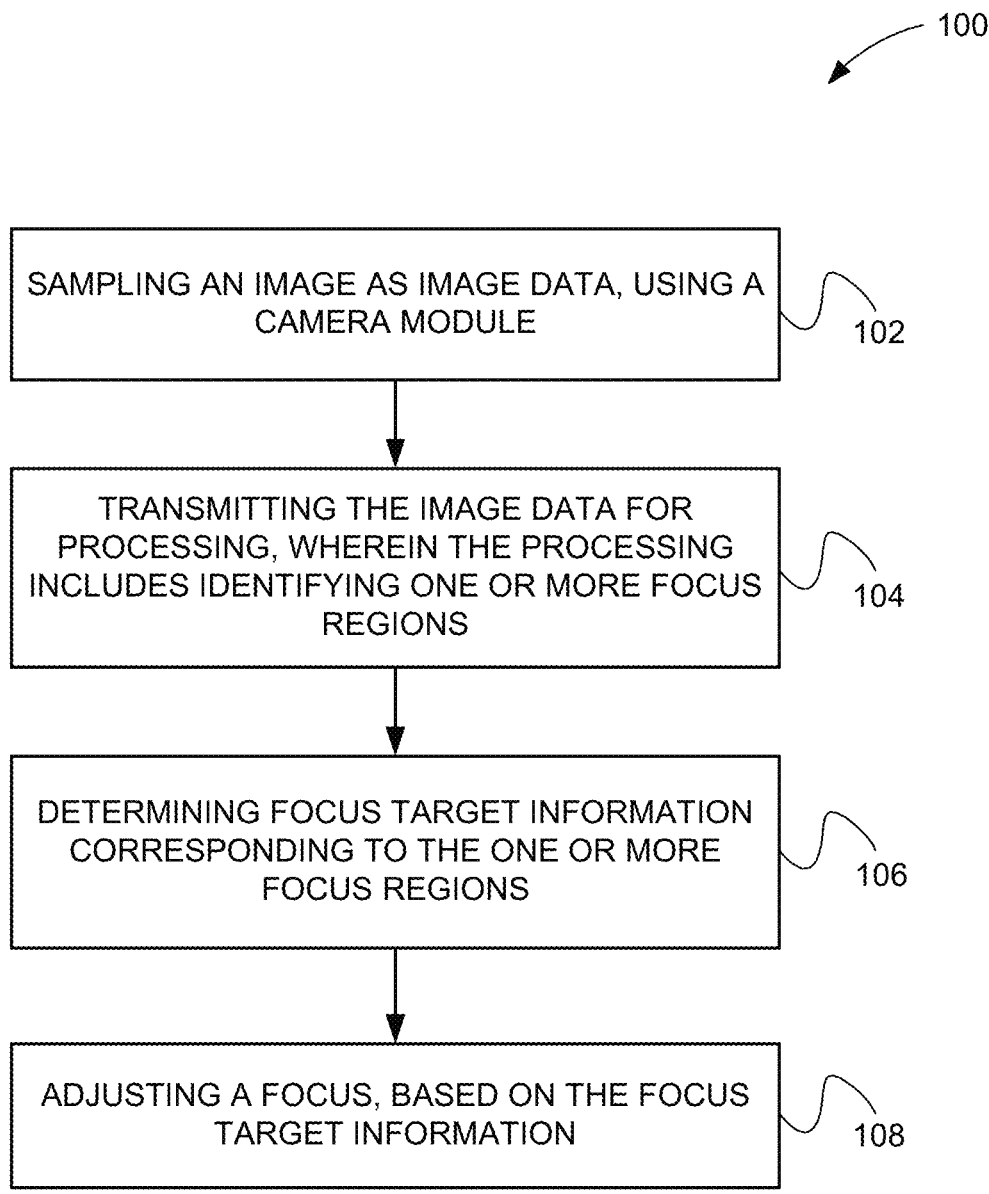
FIG. 1 illustrates an exemplary method carried out for adjusting focus based on focus target information, in accordance with one possible embodiment.

FIG. 1 illustrates an exemplary method 100 carried out for adjusting focus based on focus target information, in accordance with one possible embodiment. As an option, the exemplary method 100 may be implemented in the context of the details of any of the Figures. Of course, however, the exemplary method 100 may be carried out in any desired environment.

As shown, an image is sampled as image data, using a camera module. See operation 102. Additionally, the camera module may transmit the image data to an application processor. In the context of the present description, such image data includes any data associated with an image, including photodiode voltage, photodiode current, light intensity, and data resulting from analog-to-digital converters sampling voltages and/or currents. Furthermore, additional images may be sampled and added to the image data.

In one embodiment, the camera module may include an image sensor, a controller comprising interface circuitry for the image sensor (e.g., timing control logic, analog-to-digital conversion circuitry, focus control system circuitry, etc.) and interface circuitry for communicating with an application processor and/or SoC, a lens assembly, and other control electronics. Additionally, in another embodiment, the application processor may include a system on a chip (SoC) or integrated circuit.

In operation 104, the image data is transmitted for processing, wherein the processing includes identifying one or more focus regions. In one embodiment, a system on a chip (SoC) may be used to transmit the image data, and/or to process the image data. Additionally, in one embodiment, such a processing of the image data may include compressing the image data, at least in part, normalizing the image data, correcting and/or adjusting one or more parameters (e.g. white balance, color balance, exposure, brightness, saturation, black-points, mid-points, etc.) associated with the image data, or analyzing the image data. Further, analyzing the image data may include identifying one or more objects.

In one embodiment, identifying one or more focus regions may include identifying one or more objects (e.g., human faces), identifying a fixed region bounding a specified location, detecting edges within the image data (e.g., region boundaries), detecting changes in color or lighting, changes in viewing direction, changes in size or shape, grayscale matching, gradient matching, or changes in a histogram. Furthermore, identifying one or more focus regions may include executing an image classifier to identify objects within the image data. Moreover, in another embodiment, such characteristics may be used to further match the image data with the name of a real object. For example, image data may be processed by an image classifier to identify a location of a ball on a soccer field. The identifying may identify differences in color and/or geometric features between the round white and black soccer ball and a textured swath of green grass. Based on such information, the white and black soccer ball may be further identified as a soccer ball, and the green grass may be further identified as grass. In some embodiments, identifying the name of a real object may include sending image data and/or characteristics (e.g. edges, changes in color, etc.) to a separate server to more accurately and efficiently process the data characteristics to actually identify and match the object with a name.

As such, in various embodiments, identifying one more objects may include, at one step, separating one object at one location from another object at another location as contained within image data, and at another step, identifying the name of the one object and the name (or other identifier) of another object.

As such, the focus target information corresponding to the one or more focus regions is determined. See operation 106. In the context of the present description, such focus target information includes any two dimensional (2D) coordinates, pixel image plane coordinates, integer pixel coordinates, normalized coordinates (e.g., 0.0 to 1.0 in each dimension), XY coordinates, or any other technically feasible coordinates within an orthogonal or non-orthogonal coordinate system. The coordinates may be represented using any technically feasible technique, such as a list or array of XY coordinates, or a bit map where the state of each bit map element represents whether a coordinate corresponding to the element is included as one of the coordinates. Additionally, the focus target information may include image data from which a focus weight mask may be inferred (contrast, saturation, edge information, etc.). In one embodiment, a translation of coordinates may occur, including, for example, from 3D mapping to 2D mapping, from image sensor row and column mapping to image plane mapping, or from XY image coordinates to pixel image coordinates.

In one embodiment, the determination of the focus target information may be automatic. For example, based on the identification of one or more objects, it may be determined which object is closest to the camera module, and focus target information for that indicated closest object may be provided to the camera module as a focus region. Of course, in other embodiments, the settings associated with the camera module may be configured to establish a priority associated with object(s). For example, faces (even multiple) may take collectively a higher priority score than an inanimate object in the background. As such, in various embodiments, the position, type (e.g. face), number, brightness, and coloring of the object(s), among other characteristics, may be used to establish a priority for the object(s). The priority may be used in setting a focus for the camera module. The priority may also be used to specify a set of focus distances for capturing different images in an image stack. Resulting images may then be used for focus stacking or separately viewed.

Still yet, in one embodiment, the priority of the object(s) may be based on data associated with more than one device. For example, in one embodiment, data collected from social media services may be used to identify the probability of which object is most important to the user (e.g. based on past usage, based on identified preferences, etc.). In another embodiment, more than one camera is used to photograph an object, and the data collected from each camera may collectively be used to assess the priority ranking of the identified object(s). For example, in one embodiment, an individual may be standing near a tree. The first camera captures the individual and the tree. However, based on just the position of the individual and the tree, it may not be automatically determined that the individual should be in focus. Receiving input from multiple devices, however, may allow the system to know that the individual in the photo was consistently the object of interest. For example, a camera photographing from a separate angle may include the individual but the angle may crop out the tree. In this manner, the collective data from multiple camera modules may be used to determine the priority of the object(s), which may then be used to determine the focus target information of the object(s) automatically. The collective data may be shared among mobile devices through any technically feasible wireless data network. One or more of the mobile devices may then identify which object or objects should be prioritized as focus regions.

Additionally, in another embodiment, the determination of the focus target information may be manual. For example, in one embodiment, the camera module may transmit the image data to the SoC to be displayed on a display unit coupled to the SoC. A user may manually select one or more regions corresponding with focus target information. For example, the user may select one or more objects being displayed on the display unit using a touch gesture input or simply a "touch input" (e.g., touching the one or more objects being displayed by the display unit), wherein the touch input provides corresponding focus target information. Such focus target information may then be received by the SoC and sent from the SoC to the camera module, thereby directing the camera module to focus at the focus target information.

As shown, a focus is adjusted, based on the focus target information. See operation 108. In one embodiment, the camera module may adjust focus of an optical lens assembly to focus at the focus target information (e.g. coordinates), which may be associated with a two-dimensional coordinate space of an active sensing region of an image sensor within the camera module. In one embodiment, the image sensor includes an array of focus pixels, each associated with a region identified by an XY coordinate. In one embodiment, the native resolution of the image sensor may be higher than the resolution of focus pixels embedded within the image sensor, and a given XY coordinate may be mapped to one or more of the focus pixels embedded within the image sensor. For example, an XY coordinate may be positioned between two or more focus pixels and mapped to a nearest focus pixel. Alternatively, the XY coordinate may be positioned between two or more focus pixels and a weight or priority may be applied when focusing based on the two or more focus pixels to achieve focus at the XY coordinate. In certain embodiments, information from a collection of focus pixels associated with a focus region is aggregated to generate a focus estimate (e.g., according to a cost function) for the focus region (or multiple focus regions). Of course, any other technically feasible method for adjusting focus may be used. For example, adjusting the focus may involve physically moving one or more lenses into a target focus position or adjusting an electrical focus signal (e.g., voltage level) to control an optical element having an electrically-variable index of refraction into a target focus configuration.

Figure 2:
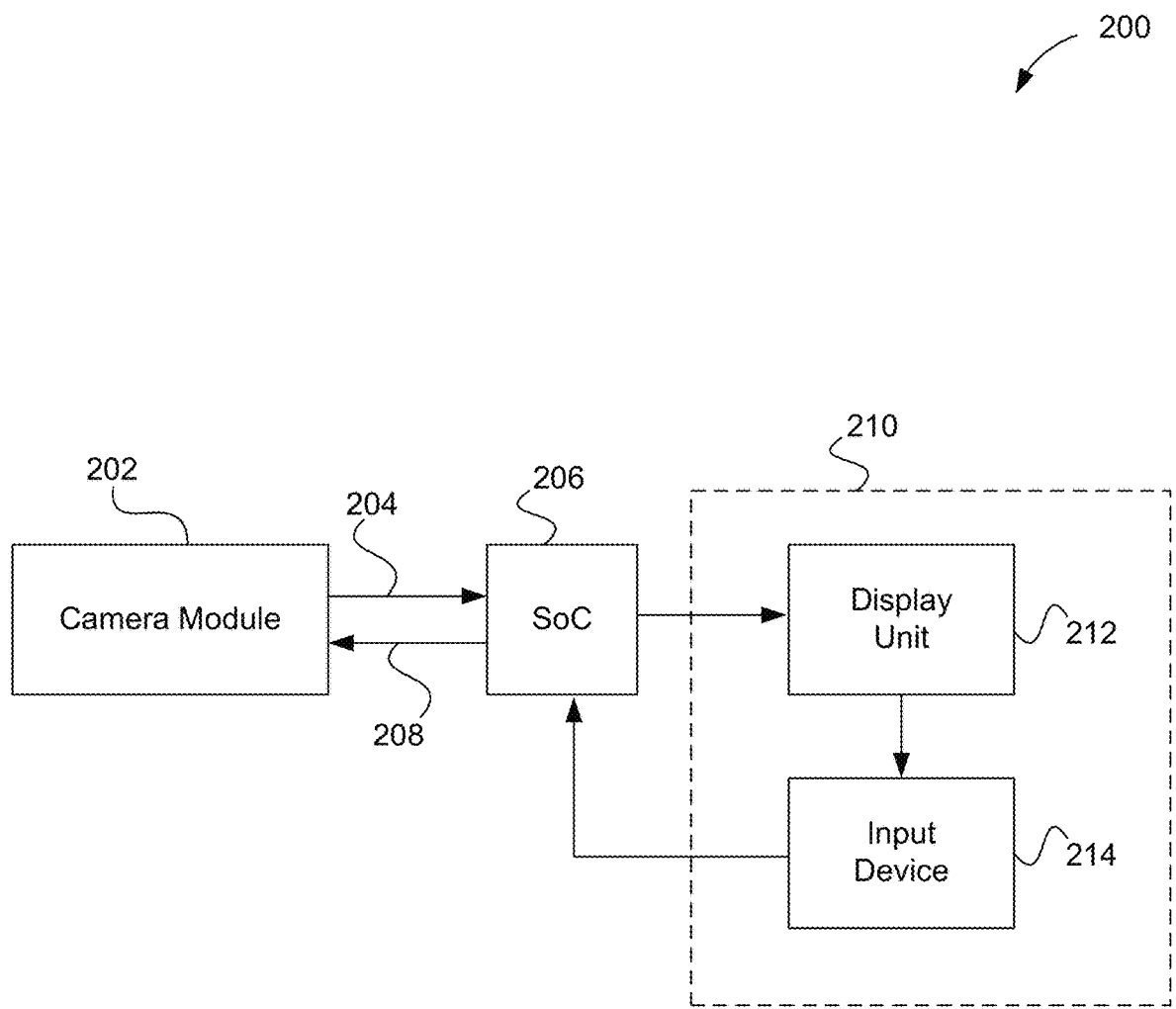
FIG. 2 illustrates an exemplary system configured to adjust focus based on focus target information, in accordance with one embodiment.

FIG. 2 illustrates an exemplary system 200 configured to adjust focus based on focus target information, in accordance with one embodiment. As an option, the exemplary system 200 may be implemented in the context of the details of any of the Figures. Of course, however, the exemplary system 200 may be carried out in any desired environment. Further, the aforementioned definitions may equally apply to the description below.

As shown, a camera module 202 transmits image data 204 to SoC 206. In one embodiment, based on the received image data, the SoC 206 may identify one or more objects in the image data, and may determine focus target information (e.g. coordinates) associated with the identified one or more objects. Further, the SoC may transmit the focus target information 208 back to the camera module 202 which may then adjust the focus based on the focus target information indicated by the SoC 206.

In an optional embodiment 210, the SoC 206 may be used to generate image data used by display unit 212 to generate a corresponding visual image. For example, in one embodiment, the SoC 206 may generate and transmit image data for display on the display unit. In response to visual images displayed by display unit 212, a user may provide one or more touch gesture inputs (touch inputs). The touch inputs may be received by an input device 214, wherein the touch inputs may identify a location (or displayed object located at the location) of the image data as shown on display unit 212 which should be in focus. In one embodiment, the input device 214 comprises a capacitive touch input panel. In another embodiment, the input device 214 may include an audio detection system configured to receive and decode verbal commands (e.g. "make the tree in focus", etc.). Of course, any type of input (e.g. touch, verbal, stylus, gaze detection, etc.) may be sampled by input device 214.

Input data from input device 214 may then be transmitted back to SoC 206, which may then determine focus target information (e.g. coordinates) associated with the identified one or more objects. Additionally, once such focus target information is identified, the SoC may transmit the focus target information 208 back to the camera module 202, which may then adjust the focus based on the focus target information indicated by the SoC 206.

Figure 3A:
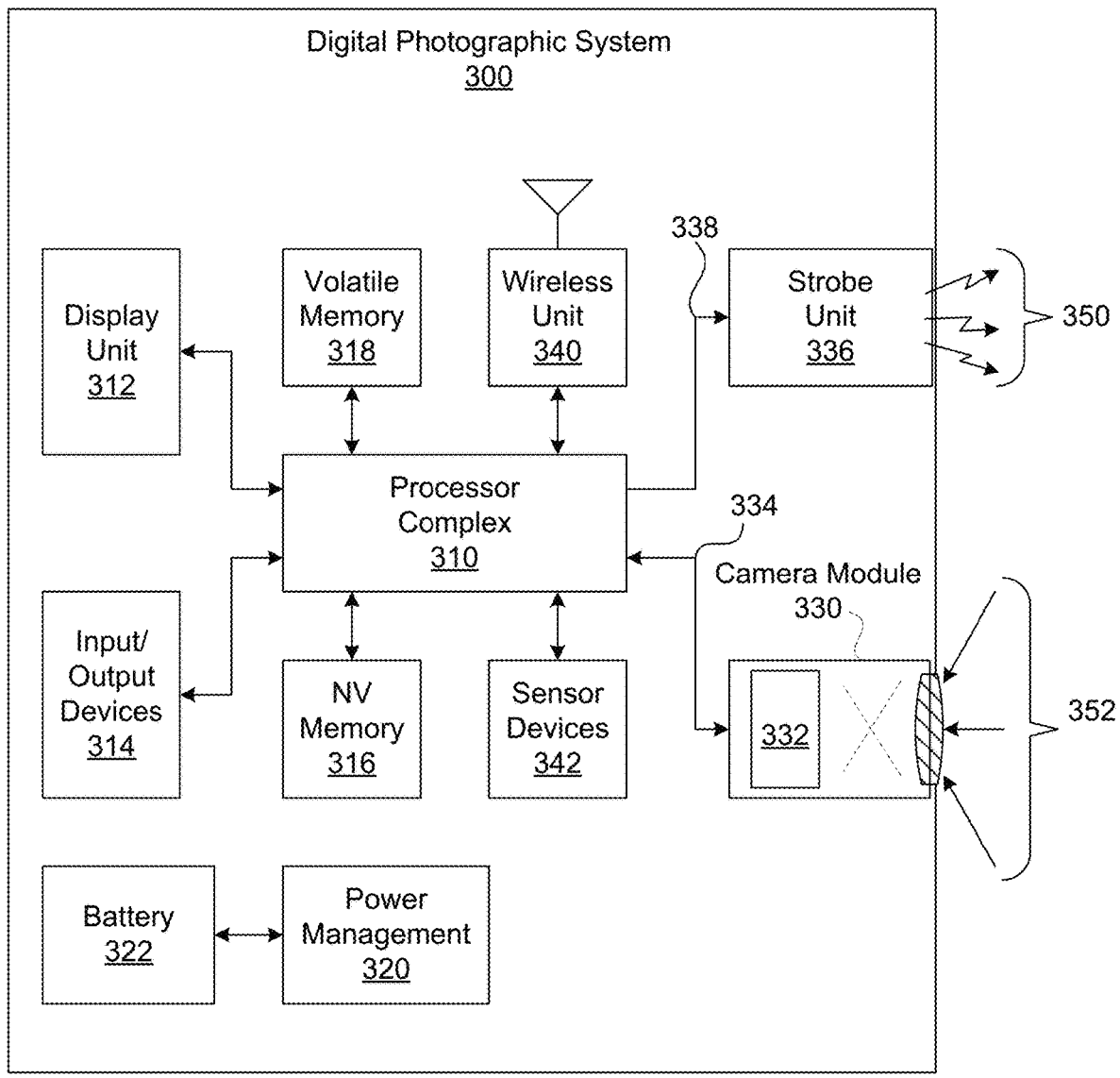
FIG. 3A illustrates a digital photographic system, in accordance with an embodiment.

FIG. 3A illustrates a digital photographic system 300, in accordance with one embodiment. As an option, the digital photographic system 300 may be implemented in the context of the details of any of the Figures disclosed herein. Of course, however, the digital photographic system 300 may be implemented in any desired environment. Further, the aforementioned definitions may equally apply to the description below.

As shown, the digital photographic system 300 may include a processor complex 310 coupled to a camera module 330 via a camera interconnect 334. In one embodiment, the processor complex 310 is coupled to a strobe unit 336. The digital photographic system 300 may also include, without limitation, a display unit 312, a set of input/output devices 314, non-volatile memory 316, volatile memory 318, a wireless unit 340, and sensor devices 342, each coupled to the processor complex 310. In one embodiment, a power management subsystem 320 is configured to generate appropriate power supply voltages for each electrical load element within the digital photographic system 300. A battery 322 may be configured to supply electrical energy to the power management subsystem 320. The battery 322 may implement any technically feasible energy storage system, including primary or rechargeable battery technologies. Of course, in other embodiments, additional or fewer features, units, devices, sensors, or subsystems may be included in the system.

In one embodiment, a strobe unit 336 may be integrated into the digital photographic system 300 and configured to provide strobe illumination 350 during an image sample event performed by the digital photographic system 300. In another embodiment, a strobe unit 336 may be implemented as an independent device from the digital photographic system 300 and configured to provide strobe illumination 350 during an image sample event performed by the digital photographic system 300. The strobe unit 336 may comprise one or more LED devices, a gas-discharge illuminator (e.g. a Xenon strobe device, a Xenon flash lamp, etc.), or any other technically feasible illumination device. In certain embodiments, two or more strobe units are configured to synchronously generate strobe illumination in conjunction with sampling an image. In one embodiment, the strobe unit 336 is controlled through a strobe control signal 338 to either emit the strobe illumination 350 or not emit the strobe illumination 350. The strobe control signal 338 may be implemented using any technically feasible signal transmission protocol. The strobe control signal 338 may indicate a strobe parameter (e.g. strobe intensity, strobe color, strobe time, etc.), for directing the strobe unit 336 to generate a specified intensity and/or color of the strobe illumination 350. The strobe control signal 338 may be generated by the processor complex 310, the camera module 330, or by any other technically feasible combination thereof. In one embodiment, the strobe control signal 338 is generated by a camera interface unit within the processor complex 310 and transmitted to both the strobe unit 336 (via strobe control signal 338) and the camera module 330 (via the camera interconnect 334). In another embodiment, strobe control signal 338 is generated by camera module 330 and transmitted to strobe unit 336 via the camera interconnect 334.

Optical scene information 352, which may include at least a portion of the strobe illumination 350 reflected from objects in an associated photographic scene, is focused as an optical image onto an image sensor 332 within the camera module 330. The image sensor 332 generates an electronic representation of the optical image. The electronic representation comprises spatial color intensity information, which may include different color intensity samples (e.g. red, green, and blue light, etc.). In other embodiments, the spatial color intensity information may also include samples for white light. The electronic representation is transmitted to the processor complex 310 via the camera interconnect 334, which may implement any technically feasible signal transmission protocol. In certain embodiments, image sensor 332 includes an array of focus pixels embedded within an array of native imaging pixels. Such focus pixels may be implemented using phase detection techniques, and may comprise structures known in the art as phase difference detection pixels. In one embodiment, image sensor 332 implements a Bayer filter mosaic known in the art, with selected green pixels configured to implement phase difference detection and to act as focus pixels. In other embodiments, image sensor 332 implements the focus pixels as an array of buried phase difference detection structures behind an array of imaging pixels. The buried phase difference detection structures are configured to detect photons that are not absorbed by the imaging pixels, with the imaging pixels and related structures configured to provide masking to facilitate phase detection.

In one embodiment, input/output devices 314 may include, without limitation, a capacitive touch input device (touch input surface), a resistive tablet input surface, one or more buttons, one or more knobs, light-emitting devices, light detecting devices, sound emitting devices, sound detecting devices, or any other technically feasible device or devices for receiving user input and converting the input to electrical signals, or converting electrical signals into a physical signal. In one embodiment, the input/output devices 314 include a capacitive touch input surface coupled to a display unit 312. A touch entry display system may include the display unit 312 and a capacitive touch input surface, also coupled to processor complex 310.

Additionally, in other embodiments, non-volatile (NV) memory 316 is configured to store data when power is interrupted. In one embodiment, the NV memory 316 comprises one or more flash memory devices (e.g. ROM, PCM, FeRAM, FRAM, PRAM, MRAM, NRAM, etc.). The NV memory 316 comprises a non-transitory computer-readable medium, which may be configured to include programming instructions for execution by one or more processing units within the processor complex 310. The programming instructions may implement, without limitation, an operating system (OS), UI software modules, image processing and storage software modules, one or more input/output devices 314 connected to the processor complex 310, one or more software modules for sampling an image stack through camera module 330, one or more software modules for presenting the image stack or one or more synthetic images generated from the image stack through the display unit 312. As an example, in one embodiment, the programming instructions may also implement one or more software modules for merging images or portions of images within the image stack, aligning at least portions of each image within the image stack, or a combination thereof. In another embodiment, the processor complex 310 may be configured to execute the programming instructions, which may implement one or more software modules operable to create a high dynamic range (HDR) image. In yet another embodiment, the programming instructions implement a method for determining a focus region and transmitting associated focus target information (e.g. coordinates) to camera module 330. In such an embodiment, camera module 330 receives the focus target information and adjusts an optical lens assembly to focus optical scene information 352 onto image sensor 332 at the focus target information (e.g. coordinates). In certain embodiments, two or more different focus regions are determined and corresponding focus target information (e.g. coordinates) are transmitted to camera module 330. Each of the two or more different focus regions may include a weight or priority that may also be transmitted to camera module 330 and the camera module may focus according to both focus target information (e.g. coordinates) and corresponding weights and/or priorities for the focus target information (e.g. coordinates).

Still yet, in one embodiment, one or more memory devices comprising the NV memory 316 may be packaged as a module configured to be installed or removed by a user. In one embodiment, volatile memory 318 comprises dynamic random access memory (DRAM) configured to temporarily store programming instructions, image data such as data associated with an image stack, and the like, accessed during the course of normal operation of the digital photographic system 300. Of course, the volatile memory may be used in any manner and in association with any other input/output device 314 or sensor device 342 attached to the process complex 310.

In one embodiment, sensor devices 342 may include, without limitation, one or more of an accelerometer to detect motion and/or orientation, an electronic gyroscope to detect motion and/or orientation, a magnetic flux detector to detect orientation, a global positioning system (GPS) module to detect geographic position, or any combination thereof. Of course, other sensors, including but not limited to a motion detection sensor, a proximity sensor, an RGB (e.g., diffuse ambient) light sensor, a gesture sensor, a 3-D input image sensor, a pressure sensor, and an indoor position sensor, may be integrated as sensor devices. In one embodiment, the sensor devices may be one example of input/output devices 314.

Wireless unit 340 may include one or more digital radios configured to send and receive digital data. In particular, the wireless unit 340 may implement wireless standards (e.g. WiFi, Bluetooth, NFC, etc.), and may implement digital cellular telephony standards for data communication (e.g. CDMA, 3G, 4G, LTE, LTE-Advanced, etc.). Of course, any wireless standard or digital cellular telephony standards may be implemented and used.

In one embodiment, the digital photographic system 300 is configured to transmit one or more digital photographs to a network-based (online) or "cloud-based" photographic media service via the wireless unit 340. The one or more digital photographs may reside within either the NV memory 316 or the volatile memory 318, or any other memory device associated with the processor complex 310. In one embodiment, a user may possess credentials to access an online photographic media service and to transmit one or more digital photographs for storage to, retrieval from, and presentation by the online photographic media service. The credentials may be stored or generated within the digital photographic system 300 prior to transmission of the digital photographs. The credentials may be provided in association with a user login for a network service, such as a social network service login. The online photographic media service may comprise a social networking service, photograph sharing service, or any other network-based service that provides storage of digital photographs, processing of digital photographs, transmission of digital photographs, sharing of digital photographs, or any combination thereof. In certain embodiments, one or more digital photographs are generated by the online photographic media service based on image data (e.g. image stack, HDR image stack, image package or container, etc.) transmitted to servers associated with the online photographic media service. In such embodiments, a user may upload one or more source images from the digital photographic system 300 for processing by the online photographic media service.

In one embodiment, the digital photographic system 300 comprises at least one instance of a camera module 330. In another embodiment, the digital photographic system 300 comprises a plurality of camera modules 330. Such an embodiment may also include at least one strobe unit 336 configured to illuminate a photographic scene, sampled as multiple views by the plurality of camera modules 330. The plurality of camera modules 330 may be configured to sample a wide angle view (e.g., greater than forty-five degrees of sweep among cameras) to generate a panoramic photograph. In one embodiment, a plurality of camera modules 330 may be configured to sample two or more different narrow angle views (e.g., less than forty-five degrees of sweep among cameras) to generate a stereoscopic photograph. In other embodiments, a plurality of camera modules 330 may be configured to generate a 3-D image or to otherwise display a depth perspective (e.g. a z-component, etc.) as shown on the display unit 312 or any other display device.

In one embodiment, a display unit 312 may be configured to display a two-dimensional array of pixels to form an image for display. The display unit 312 may comprise a liquid-crystal display (LCD), a light-emitting diode (LED) display, an organic LED (OLED) display, or any other technically feasible type of display device. In certain embodiments, the display unit 312 may be able to display a narrower (limited) dynamic range of image intensity values than a complete range of intensity values sampled from a photographic scene, such as within a single HDR image or over a set of two or more images comprising a multiple exposure or HDR image stack. In one embodiment, images comprising an image stack may be merged according to any technically feasible HDR blending technique to generate a synthetic image for display within dynamic range constraints of the display unit 312. In one embodiment, the limited dynamic range may specify an eight-bit per color channel binary representation of corresponding color intensities. In other embodiments, the limited dynamic range may specify more than eight-bits (e.g., 10 bits, 12 bits, or 14 bits, etc.) per color channel binary representation.

Figure 3B:
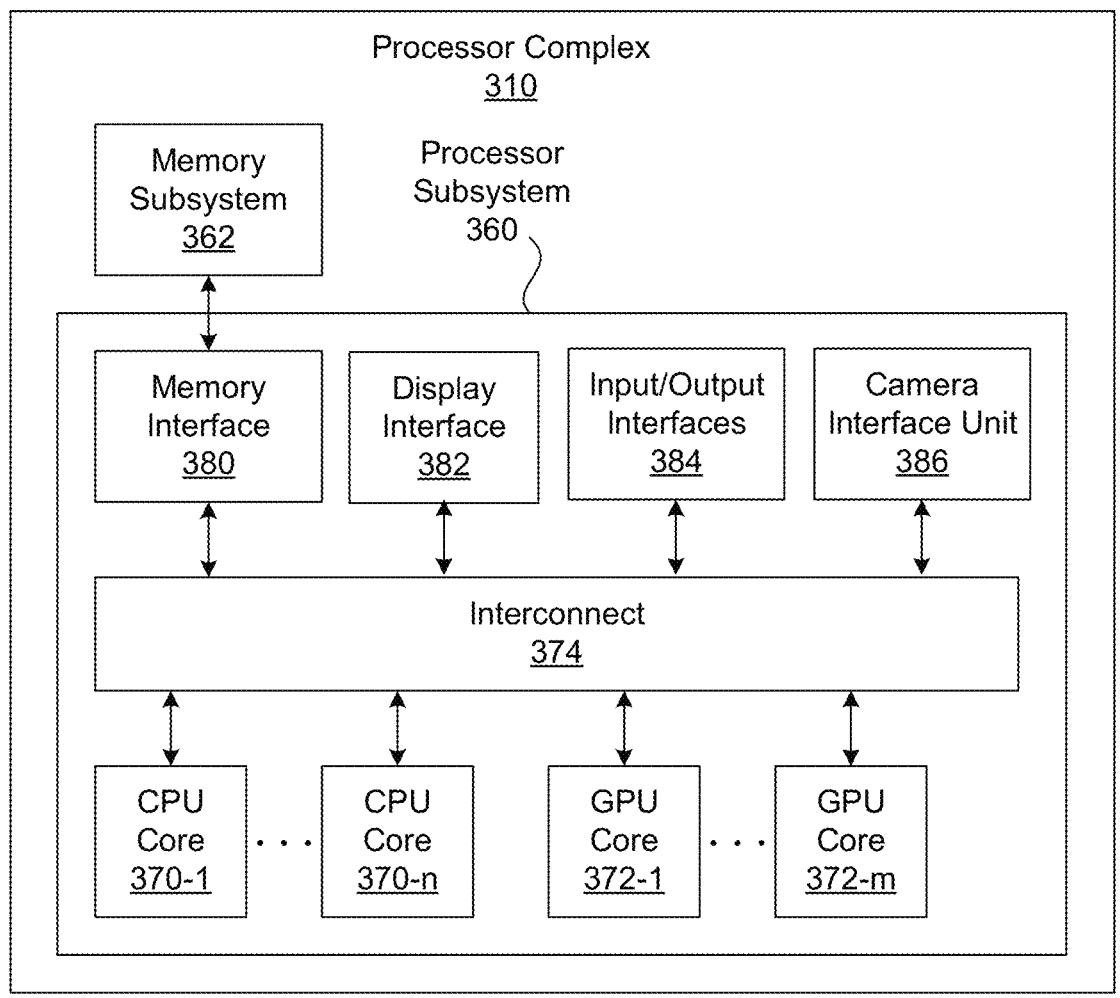
FIG. 3B illustrates a processor complex within the digital photographic system, according to one embodiment.

FIG. 3B illustrates a processor complex 310 within the digital photographic system 300 of FIG. 3A, in accordance with one embodiment. As an option, the processor complex 310 may be implemented in the context of the details of any of the Figures disclosed herein. Of course, however, the processor complex 310 may be implemented in any desired environment. Further, the aforementioned definitions may equally apply to the description below.

As shown, the processor complex 310 includes a processor subsystem 360 and may include a memory subsystem 362. In one embodiment, processor complex 310 may comprise a system on a chip (SoC) device that implements processor subsystem 360, and memory subsystem 362 comprises one or more DRAM devices coupled to the processor subsystem 360. In another embodiment, the processor complex 310 may comprise a multi-chip module (MCM) encapsulating the SoC device and the one or more DRAM devices comprising the memory subsystem 362.

The processor subsystem 360 may include, without limitation, one or more central processing unit (CPU) cores 370, a memory interface 380, input/output interfaces unit 384, a camera interface unit 386, and a display interface unit 382, each coupled to an interconnect 374. The one or more CPU cores 370 may be configured to execute instructions residing within the memory subsystem 362, volatile memory 318, NV memory 316, or any combination thereof. Each of the one or more CPU cores 370 may be configured to retrieve and store data through interconnect 374 and the memory interface 380. In one embodiment, each of the one or more CPU cores 370 may include a data cache, and an instruction cache. Additionally, two or more of the CPU cores 370 may share a data cache, an instruction cache, or any combination thereof. In one embodiment, a cache hierarchy is implemented to provide each CPU core 370 with a private cache layer, and a shared cache layer.

In some embodiments, processor subsystem 360 may include one or more graphics processing unit (GPU) cores 372. Each GPU core 372 may comprise a plurality of multi-threaded execution units that may be programmed to implement, without limitation, graphics acceleration functions. In various embodiments, the GPU cores 372 may be configured to execute multiple thread programs according to well-known standards (e.g. OpenGL™ WebGL™, OpenCL™, CUDA™, etc.), and/or any other programmable rendering graphic standard. In certain embodiments, at least one GPU core 372 implements at least a portion of a motion estimation function, such as a well-known Harris detector or a well-known Hessian-Laplace detector. Such a motion estimation function may be used at least in part to align images or portions of images within an image stack. For example, in one embodiment, an HDR image may be compiled based on an image stack, where two or more images are first aligned prior to compiling the HDR image.

Furthermore, in another embodiment, the motion estimation function may be configured to implement object tracking during real-time video capture to identify one or more focus regions and corresponding focus target information (e.g. coordinates) that may be transmitted to camera module 330. Camera module 330 may focus at the focus target information (e.g. coordinates) to provide continuous focus of objected identified by the motion estimation function. In certain embodiments, the motion estimation function may implement, at least in part, an image classifier configured to identify and/or track objects within a scene. The identification and tracking may be performed during real-time video capture. In certain embodiments, a user identifies at least one object, for example using a touch input on a live preview of video. The image classifier then tracks movement of the identified object or objects to identify a focus region (or regions) associated with the object (or objects). The focus region may move as the camera moves or the actual object moves. Although motion tracking of the object may be one frame behind actual capture by camera module 330, by continuously identifying a new focus region as the object moves, the camera module 330 is able to continuously remain focused on the identified object so long as the object remains visible. One or more objects may be identified by a user, tracked, and focused so long as the camera module 330 is able to focus on two or more of the objects. If the objects move apart in depth and exceed a focus envelope for the camera module 330, a priority may be applied so that one of the objects remains in focus.

As shown, the interconnect 374 is configured to transmit data between and among the memory interface 380, the display interface unit 382, the input/output interfaces unit 384, the CPU cores 370, and the GPU cores 372. In various embodiments, the interconnect 374 may implement one or more buses, one or more rings, a cross-bar, a mesh, or any other technically feasible data transmission structure or technique. The memory interface 380 may be configured to couple the memory subsystem 362 to the interconnect 374. The memory interface 380 may also couple NV memory 316, volatile memory 318, or any combination thereof to the interconnect 374. The display interface unit 382 may be configured to couple a display unit 312 to the interconnect 374. The display interface unit 382 may implement certain frame buffer functions (e.g. frame refresh, etc.). Alternatively, in another embodiment, the display unit 312 may implement certain frame buffer functions (e.g. frame refresh, etc.). The input/output interfaces unit 384 may be configured to couple various input/output devices to the interconnect 374.

In certain embodiments, camera module 330 is configured to store exposure parameters for sampling each image associated with an image stack. For example, in one embodiment, when directed to sample a photographic scene, the camera module 330 may sample a set of images comprising the image stack according to stored exposure parameters. A software module comprising programming instructions executing within processor complex 310 may generate and store the exposure parameters prior to directing the camera module 330 to sample the image stack. In other embodiments, the camera module 330 may be used to meter an image or an image stack, and the software module comprising programming instructions executing within processor complex 310 may generate and store metering parameters prior to directing the camera module 330 to capture the image. Of course, the camera module 330 may be used in any manner in combination with the processor complex 310.

In one embodiment, exposure parameters associated with images comprising the image stack may be stored within an exposure parameter data structure that includes exposure parameters for one or more images. In another embodiment, a camera interface unit (not shown in FIG. 3B) within the processor complex 310 may be configured to read exposure parameters from the exposure parameter data structure and to transmit associated exposure parameters to the camera module 330 in preparation of sampling a photographic scene. After the camera module 330 is configured according to the exposure parameters, the camera interface may direct the camera module 330 to sample the photographic scene; the camera module 330 may then generate a corresponding image stack. The exposure parameter data structure may be stored within the camera interface unit, a memory circuit within the processor complex 310, volatile memory 318, NV memory 316, the camera module 330, or within any other technically feasible memory circuit. Further, in another embodiment, a software module executing within processor complex 310 may generate and store the exposure parameter data structure.

Camera interface unit 386 may comprise circuitry for communicating with a camera module, such as through camera interconnect 334 to camera module 330 of FIG. 3A. Said communication may include transmitting focus target information to the camera module. Focus target information may include, without limitation, one or more locations (coordinates), one or more weight masks, or one or more other data types or data structures configured to convey focus regions. Camera interface unit 386 may also include circuitry for receiving image data and/or focus data captured by an image sensor within the camera module.

Figure 3C:
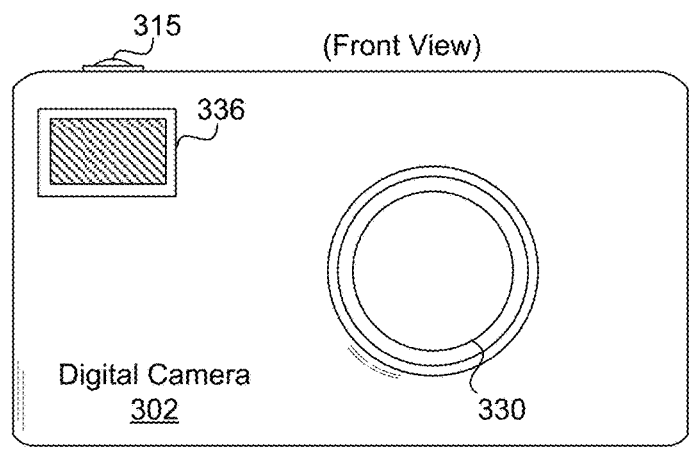
FIG. 3C illustrates a digital camera, in accordance with an embodiment.

FIG. 3C illustrates a digital camera 302, in accordance with one embodiment. As an option, the digital camera 302 may be implemented in the context of the details of any of the Figures disclosed herein. Of course, however, the digital camera 302 may be implemented in any desired environment. Further, the aforementioned definitions may equally apply to the description below.

In one embodiment, the digital camera 302 may be configured to include a digital photographic system, such as digital photographic system 300 of FIG. 3A. As shown, the digital camera 302 includes a camera module 330, which may include optical elements configured to focus optical scene information representing a photographic scene onto an image sensor, which may be configured to convert the optical scene information to an electronic representation of the photographic scene.

Additionally, the digital camera 302 may include a strobe unit 336, and may include a shutter release button 315 for triggering a photographic sample event, whereby digital camera 302 samples one or more images comprising the electronic representation. In other embodiments, any other technically feasible shutter release mechanism may trigger the photographic sample event (e.g. such as a timer trigger or remote control trigger, etc.). In certain embodiments, the shutter release mechanism initiates capture of a video by digital camera 302.

Figure 3D:
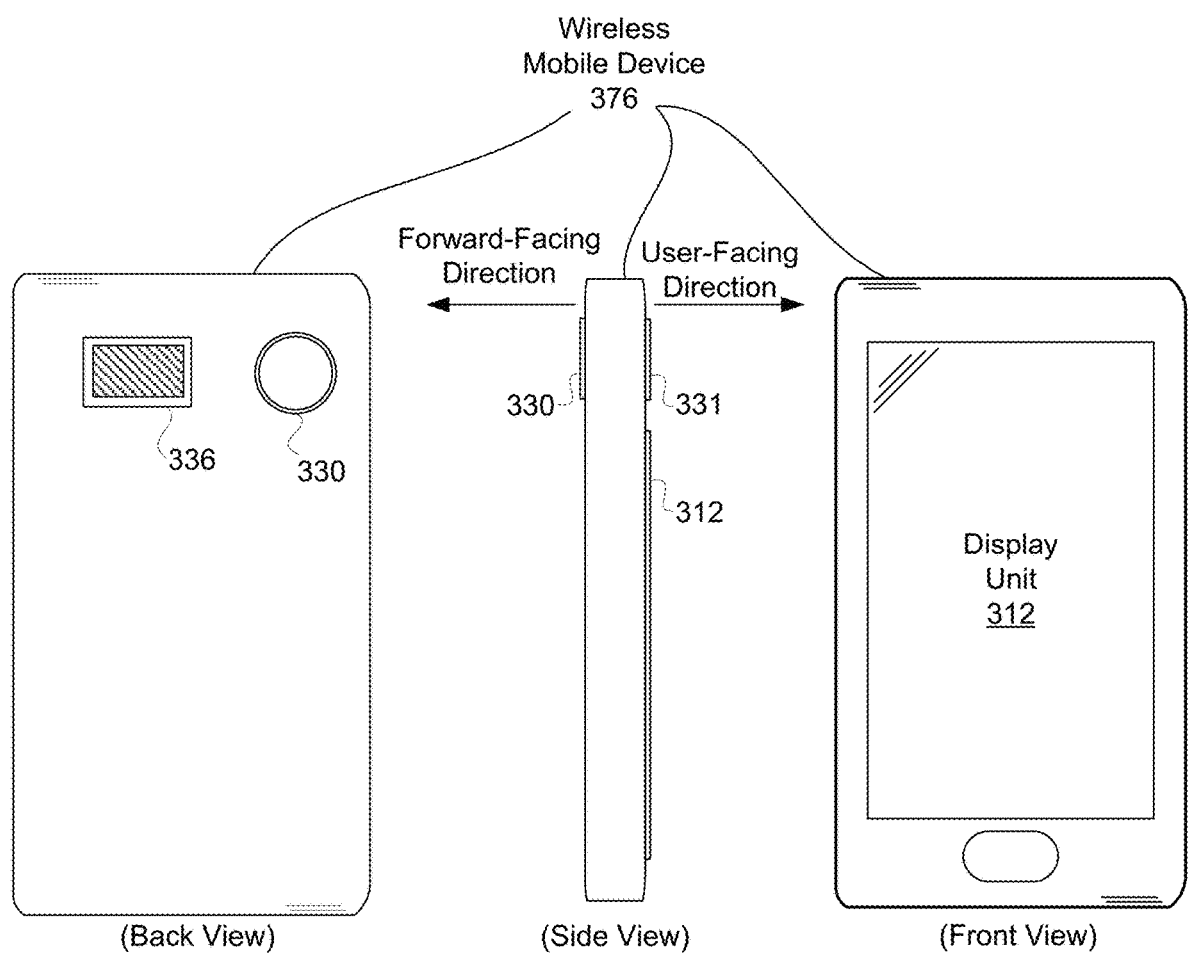
FIG. 3D illustrates a wireless mobile device, in accordance with another embodiment.

FIG. 3D illustrates a wireless mobile device 376, in accordance with another embodiment. As an option, the mobile device 376 may be implemented in the context of the details of any of the Figures disclosed herein. Of course, however, the mobile device 376 may be implemented in any desired environment. Further, the aforementioned definitions may equally apply to the description below.

In one embodiment, the mobile device 376 may be configured to include a digital photographic system (e.g. such as digital photographic system 300 of FIG. 3A), which is configured to sample a photographic scene. In various embodiments, a camera module 330 may include optical elements configured to focus optical scene information representing the photographic scene onto an image sensor, which may be configured to convert the optical scene information to an electronic representation of the photographic scene. Further, a shutter release command may be generated through any technically feasible mechanism, such as a virtual button, which may be activated by a touch gesture/input on a touch entry display system comprising display unit 312, or a physical button, which may be located on any face or surface of the mobile device 376. Of course, in other embodiments, any number of other buttons, external inputs/outputs, or digital inputs/outputs may be included on the mobile device 376, and which may be used in conjunction with the camera module 330.

As shown, in one embodiment, a touch entry display system comprising display unit 312 is disposed on the opposite side of mobile device 376 from camera module 330. In certain embodiments, the mobile device 376 includes a user-facing camera module 331 and may include a user-facing strobe unit (not shown). Of course, in other embodiments, the mobile device 376 may include any number of user-facing camera modules or rear-facing camera modules, as well as any number of user-facing strobe units or rear-facing strobe units.

In some embodiments, the digital camera 302 and the mobile device 376 may each generate and store a synthetic image based on an image stack sampled by camera module 330. The image stack may include one or more images sampled under ambient lighting conditions, one or more images sampled under strobe illumination from strobe unit 336, or a combination thereof. Furthermore, the digital camera 302 and the mobile device 376 may each generate and store video footage based on sequential frames sampled by camera module 330 or 331.

Figure 3E:
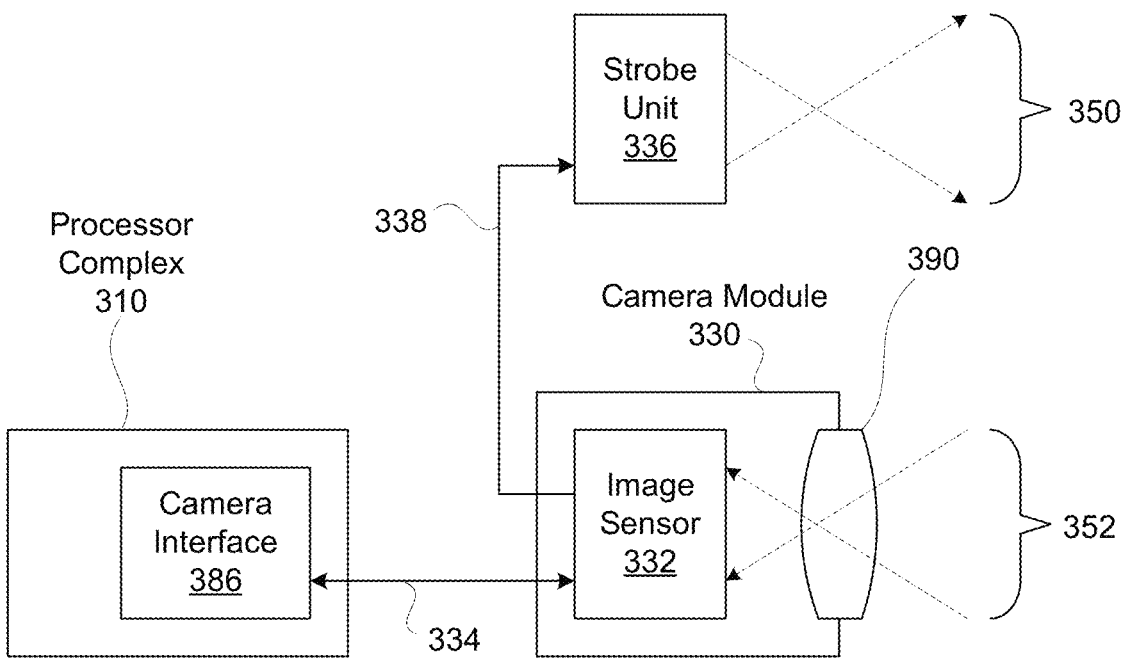
FIG. 3E illustrates a camera module configured to sample an image, according to one embodiment.

FIG. 3E illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to control strobe unit 336 through strobe control signal 338. As shown, a lens 390 is configured to focus optical scene information 352 onto image sensor 332 to be sampled. More generally, a lens assembly comprising lens 390 may focus optical scene information 352 onto image sensor 332, wherein a focus distance associated with focusing the optical scene information 352 is determined by a focus signal. In one embodiment, image sensor 332 advantageously controls detailed timing of the strobe unit 336 though the strobe control signal 338 to reduce inter-sample time between an image sampled with the strobe unit 336 enabled, and an image sampled with the strobe unit 336 disabled. For example, the image sensor 332 may enable the strobe unit 336 to emit strobe illumination 350 less than one microsecond (or any desired length) after image sensor 332 completes an exposure time associated with sampling an ambient image and prior to sampling a flash image.

In other embodiments, the strobe illumination 350 may be configured based on a desired one or more target points. For example, in one embodiment, the strobe illumination 350 may light up an object in the foreground, and depending on the length of exposure time, may also light up an object in the background of the image. In one embodiment, once the strobe unit 336 is enabled, the image sensor 332 may then immediately begin exposing a flash image. The image sensor 332 may thus be able to directly control sampling operations, including enabling and disabling the strobe unit 336 associated with generating an image stack, which may comprise at least one image sampled with the strobe unit 336 disabled, and at least one image sampled with the strobe unit 336 either enabled or disabled. In one embodiment, data comprising the image stack sampled by the image sensor 332 is transmitted via camera interconnect 334 to a camera interface unit 386 within processor complex 310. In some embodiments, the camera module 330 may include an image sensor controller, which may be configured to generate the strobe control signal 338 in conjunction with controlling operation of the image sensor 332.

Figure 3F:
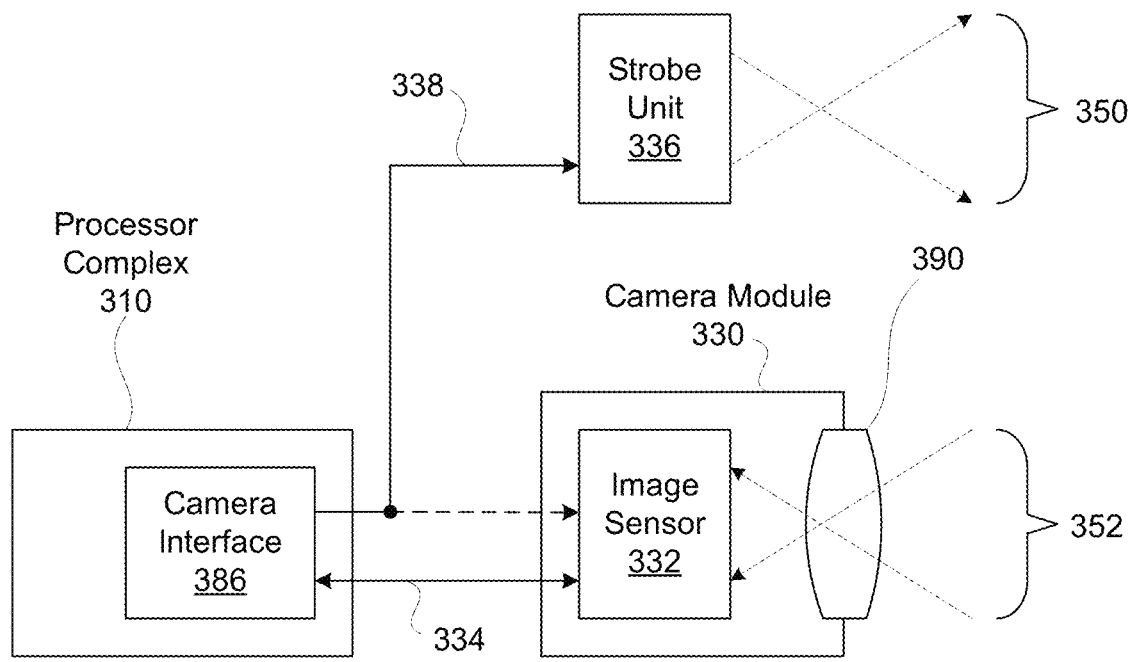
FIG. 3F illustrates a camera module configured to sample an image, according to another embodiment.

FIG. 3F illustrates a camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to sample an image based on state information for strobe unit 336. The state information may include, without limitation, one or more strobe parameters (e.g. strobe intensity, strobe color, strobe time, etc.), for directing the strobe unit 336 to generate a specified intensity and/or color of the strobe illumination 350. In one embodiment, commands for configuring the state information associated with the strobe unit 336 may be transmitted through a strobe control signal 338, which may be monitored by the camera module 330 to detect when the strobe unit 336 is enabled. For example, in one embodiment, the camera module 330 may detect when the strobe unit 336 is enabled or disabled within a microsecond or less of the strobe unit 336 being enabled or disabled by the strobe control signal 338. To sample an image requiring strobe illumination, a camera interface unit 386 may enable the strobe unit 336 by sending an enable command through the strobe control signal 338. In one embodiment, the camera interface unit 386 may be included as an interface of input/output interfaces 384 in a processor subsystem 360 of the processor complex 310 of FIG. 3B. The enable command may comprise a signal level transition, a data packet, a register write, or any other technically feasible transmission of a command. The camera module 330 may sense that the strobe unit 336 is enabled and then cause image sensor 332 to sample one or more images requiring strobe illumination while the strobe unit 336 is enabled. In such an implementation, the image sensor 332 may be configured to wait for an enable signal destined for the strobe unit 336 as a trigger signal to begin sampling a new exposure.

In one embodiment, camera interface unit 386 may transmit exposure parameters and commands to camera module 330 through camera interconnect 334. In certain embodiments, the camera interface unit 386 may be configured to directly control strobe unit 336 by transmitting control commands to the strobe unit 336 through strobe control signal 338. By directly controlling both the camera module 330 and the strobe unit 336, the camera interface unit 386 may cause the camera module 330 and the strobe unit 336 to perform their respective operations in precise time synchronization. In one embodiment, precise time synchronization may be less than five hundred microseconds of event timing error. Additionally, event timing error may be a difference in time from an intended event occurrence to the time of a corresponding actual event occurrence.

In another embodiment, camera interface unit 386 may be configured to accumulate statistics while receiving image data from camera module 330. In particular, the camera interface unit 386 may accumulate exposure statistics for a given image while receiving image data for the image through camera interconnect 334. Exposure statistics may include, without limitation, one or more of an intensity histogram, a count of over-exposed pixels, a count of under-exposed pixels, an intensity-weighted sum of pixel intensity, or any combination thereof. The camera interface unit 386 may present the exposure statistics as memory-mapped storage locations within a physical or virtual address space defined by a processor, such as one or more of CPU cores 370, within processor complex 310. In one embodiment, exposure statistics reside in storage circuits that are mapped into a memory-mapped register space, which may be accessed through the camera interconnect 334. In other embodiments, the exposure statistics are transmitted in conjunction with transmitting pixel data for a captured image. For example, the exposure statistics for a given image may be transmitted as in-line data, following transmission of pixel intensity data for the captured image. Exposure statistics may be calculated, stored, or cached within the camera interface unit 386.

In one embodiment, camera interface unit 386 may accumulate color statistics for estimating scene white balance. Any technically feasible color statistics may be accumulated for estimating white balance, such as a sum of intensities for different color channels comprising red, green, and blue color channels. The sum of color channel intensities may then be used to perform a white balance color correction on an associated image, according to a white balance model such as a gray-world white balance model. In other embodiments, curve-fitting statistics are accumulated for a linear or a quadratic curve fit used for implementing white balance correction on an image.

In one embodiment, camera interface unit 386 may accumulate spatial color statistics for performing color-matching between or among images, such as between or among an ambient image and one or more images sampled with strobe illumination. As with the exposure statistics, the color statistics may be presented as memory-mapped storage locations within processor complex 310. In one embodiment, the color statistics are mapped in a memory-mapped register space, which may be accessed through camera interconnect 334, within processor subsystem 360. In other embodiments, the color statistics may be transmitted in conjunction with transmitting pixel data for a captured image. For example, in one embodiment, the color statistics for a given image may be transmitted as in-line data, following transmission of pixel intensity data for the image. Color statistics may be calculated, stored, or cached within the camera interface 386.

In one embodiment, camera module 330 may transmit strobe control signal 338 to strobe unit 336, enabling the strobe unit 336 to generate illumination while the camera module 330 is sampling an image. In another embodiment, camera module 330 may sample an image illuminated by strobe unit 336 upon receiving an indication signal from camera interface unit 386 that the strobe unit 336 is enabled. In yet another embodiment, camera module 330 may sample an image illuminated by strobe unit 336 upon detecting strobe illumination within a photographic scene via a rapid rise in scene illumination. In one embodiment, a rapid rise in scene illumination may include at least a rate of increasing intensity consistent with that of enabling strobe unit 336. In still yet another embodiment, camera module 330 may enable strobe unit 336 to generate strobe illumination while sampling one image, and disable the strobe unit 336 while sampling a different image.

In certain embodiments, camera module 330 is configured to sample and save an ambient image, and subsequently enable strobe unit 336 while continuing to sample the image, which may be stored separately as a combined (ambient and flash) image. The ambient image and the combined image may be merged to generate a final image that incorporates both ambient image information and flash image information. In certain implementations, the ambient image may provide reference color information, while the flash image may provide intensity information with lower overall noise. In such embodiments, the metering for the flash image may be directed at an exposure goal of providing maximum flash that does not saturate ("burn out") more pixels than an equivalent exposure but without the strobe unit 336 enabled. Alternatively, the exposure goal may provide a threshold portion of saturated pixels. Furthermore, the exposure goal may limit or additionally limit a portion of saturated pixels within an identified exposure region. The identified exposure region may be selected by a user via a touch input to display unit 312. The identified exposure region may also correspond to a focus region, as described herein.

In one embodiment, camera module 330 is configured to sample a sequence of ambient image and combined image pairs. The sequence may comprise three or more pairs. Of the three or more pairs, one pair may be selected based on estimated image blur. The estimated image blur may be calculated based on measuring blur within the image, or by estimating blur based on camera movement physically measured during capture (e.g., by sampling an accelerometer or gyro sensor as one of the sensor devices 342). Of the three or more pairs, one pair with the least estimated image blur may be selected, stored, and presented to a user as a captured image, either a single merged image or as an adjustably merged image where flash contribution may be dynamically adjusted by the user. The other pairs may be discarded. Image sensor 332 may implement a global shutter or a rolling shutter.

In embodiments that implement a global shutter, the image sensor may include two or more analog storage planes to provide separate storage of the ambient image and the combined image. In an embodiment that implements a rolling shutter, the image sensor may sample one or more initial ambient images, enable the strobe unit 336, disable the strobe unit 336, and read out the combined image. In certain embodiments, strobe unit 336 is enabled for less than fifty milliseconds before being disabled. A white balance of the ambient image may be determined based on any technically feasible white balance estimation techniques. A white balance of the combined image may be determined by that of the ambient image, the color of the strobe unit 336, or a combination thereof. Color of each pixel within the combined image may be adjusted (corrected) to be consistent with a corresponding color for the ambient image. Color for the combined image may more generally be corrected to be consistent with that of the ambient image at pixel, region, and frame levels.

In certain other embodiments, camera module 330 is configured to capture video, and strobe unit 336 may be enabled during alternating frames so that camera module 330 captures sequential ambient and flash pairs; the sequential pairs may then be merged to generate sequential video frames. To avoid perceived illumination flicker, the frame rate may be set to 240 FPS (120 Hz flash illumination) or above. Exposure of flash images may be calculated with a goal of avoiding saturated (burned out) pixels. Avoiding saturated pixels at identified exposure and/or focus regions may be given greater priority and/or may be given stricter thresholds than the overall scene.

Figure 3G:
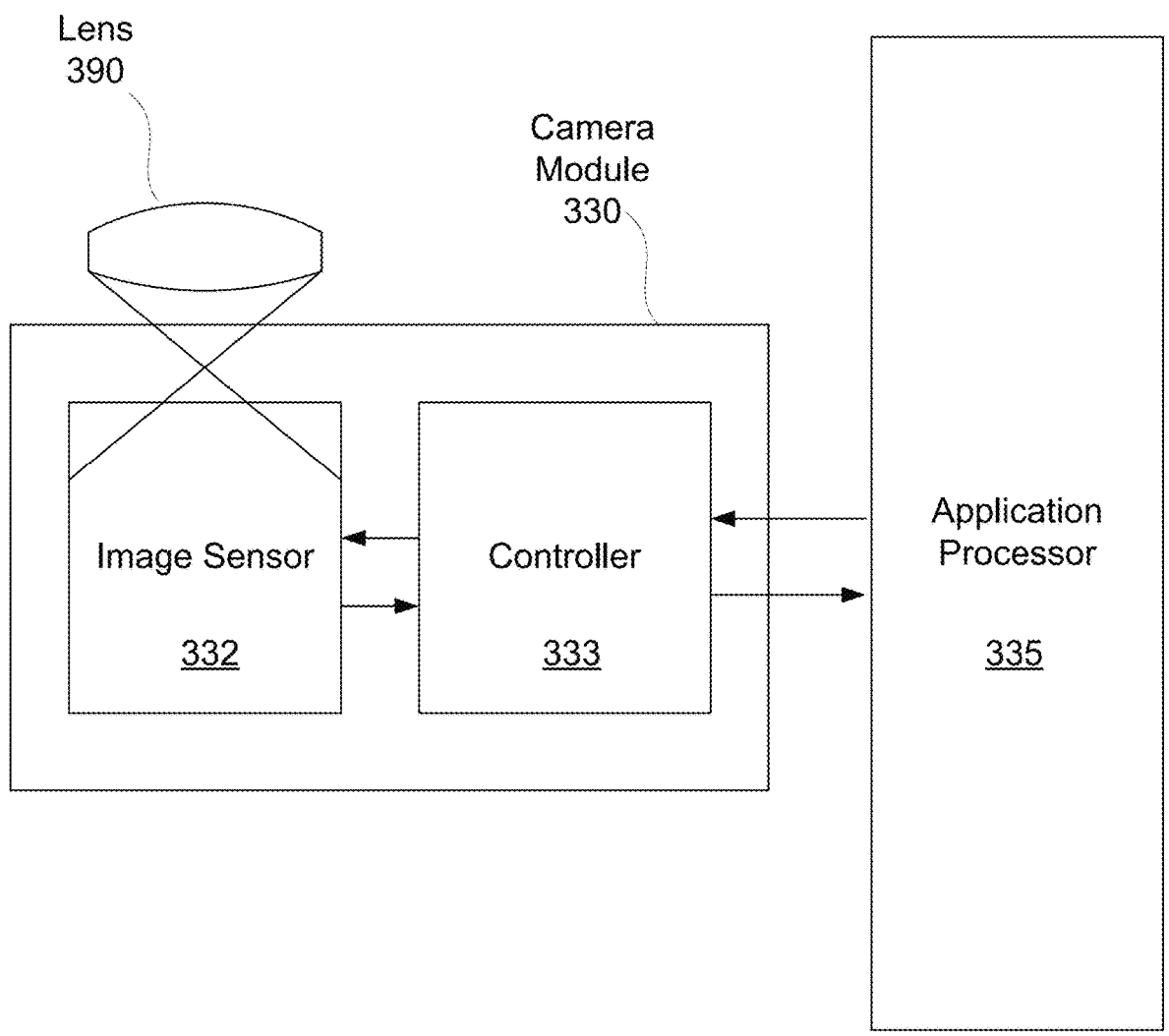
FIG. 3G illustrates a camera module in communication with an application processor, in accordance with an embodiment.

FIG. 3G illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be in communication with an application processor 335. The camera module 330 is shown to include image sensor 332 in communication with a controller 333. Further, the controller 333 is shown to be in communication with the application processor 335.

In one embodiment, the application processor 335 may reside outside of the camera module 330. As shown, the lens 390 may be configured to focus optical scene information onto image sensor 332 to be sampled. The optical scene information sampled by the image sensor 332 may then be communicated from the image sensor 332 to the controller 333 for at least one of subsequent processing and communication to the application processor 335. In another embodiment, the controller 333 may control storage of the optical scene information sampled by the image sensor 332, or storage of processed optical scene information. In one embodiment, a module housing (not shown) is configured to encompass various elements comprising the camera module 330, including, without limitation, image sensor 332 and controller 333. Furthermore, the module housing may provide physical rigidity and structure for aligning a lens assembly comprising lens 390 with image sensor 332. In various embodiments, application processor 335 is located physically outside of the module housing, thereby providing advantageous thermal isolation between the image sensor 332 (sensitive to heat) and the application processor 335 (a source of heat).

In another embodiment, the controller 333 may enable a strobe unit to emit strobe illumination for a short time duration (e.g. less than one microsecond, etc.) after image sensor 332 completes an exposure time associated with sampling an ambient image. Further, the controller 333 may be configured to generate strobe control signal 338 in conjunction with controlling operation of the image sensor 332.

In one embodiment, the image sensor 332 may be a complementary metal oxide semiconductor (CMOS) sensor, a charge-coupled device (CCD) sensor, a microbolometer array, or any other technically feasible type of image sensor device. In another embodiment, the controller 333 and the image sensor 332 may be packaged together as an integrated system or integrated circuit. In yet another embodiment, the controller 333 and the image sensor 332 may comprise discrete packages. In one embodiment, the controller 333 may provide circuitry for receiving an electrical representation of optical scene information from the image sensor 332, processing of the electrical representation (e.g. analog-to-digital conversion), timing of various functionalities, and signaling associated with the application processor 335. Further, in another embodiment, the controller 333 may provide circuitry for control of one or more of exposure, shuttering, white balance, and gain adjustment. Processing of the electrical representation by the circuitry of the controller 333 may include one or more of gain application, amplification, analog-to-digital conversion, and estimating focus at different regions within image sensor 332 based on signals from focus pixels associated with (disposed within) the different regions. After processing the electrical representation, the controller 333 may transmit corresponding digital pixel data, such as to the application processor 335.

In one embodiment, the application processor 335 may be implemented on processor complex 310 and may access data and/or programming instructions stored within one of volatile memory 318 and NV memory 316, or any other memory device and/or system. The application processor 335 may be previously configured for processing of received optical scene information or digital pixel data communicated from the camera module 330 to the application processor 335.

Figure 4:
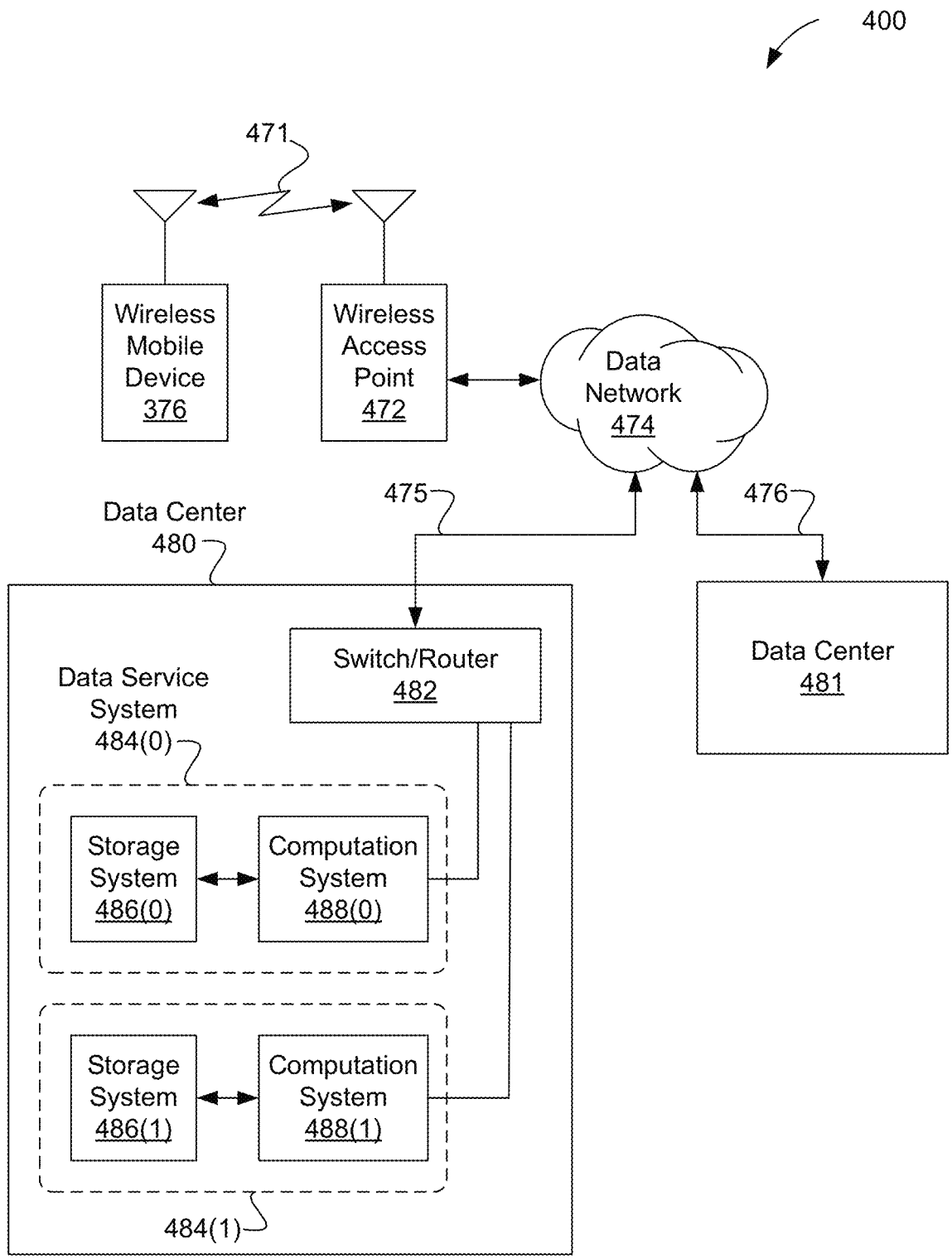
FIG. 4 illustrates a network service system, in accordance with another embodiment.

FIG. 4 illustrates a network service system 400, in accordance with one embodiment. As an option, the network service system 400 may be implemented in the context of the details of any of the Figures disclosed herein. Of course, however, the network service system 400 may be implemented in any desired environment. Further, the aforementioned definitions may equally apply to the description below.

In one embodiment, the network service system 400 may be configured to provide network access to a device implementing a digital photographic system. As shown, network service system 400 includes a wireless mobile device 376, a wireless access point 472, a data network 474, data center 480, and a data center 481. The wireless mobile device 376 may communicate with the wireless access point 472 via a digital radio link 471 to send and receive digital data, including data associated with digital images and/or digital videos. The wireless mobile device 376 and the wireless access point 472 may implement any technically feasible transmission techniques for transmitting digital data via digital a radio link 471 without departing the scope and spirit of presently disclosed embodiments. In certain embodiments, one or more of data centers 480, 481 may be implemented using virtual constructs so that each system and subsystem within a given data center 480, 481 may comprise virtual machines configured to perform specified data processing and network tasks. In other implementations, one or more of data centers 480, 481 may be physically distributed over a plurality of physical sites.

The wireless mobile device 376 may comprise a smart phone configured to include a digital camera, a digital camera configured to include wireless network connectivity, a reality augmentation device, a laptop configured to include a digital camera and wireless network connectivity, or any other technically feasible computing device configured to include a digital photographic system and wireless network connectivity.

In various embodiments, the wireless access point 472 may be configured to communicate with wireless mobile device 376 via the digital radio link 471 and to communicate with the data network 474 via any technically feasible transmission media, such as any electrical, optical, or radio transmission media. For example, in one embodiment, wireless access point 472 may communicate with data network 474 through an optical fiber coupled to the wireless access point 472 and to a router system (not shown) or a switch system (not shown) within the data network 474. A network link 475, such as a wide area network (WAN) link, may be configured to transmit data between the data network 474 and the data center 480.

In one embodiment, the data network 474 may include routers, switches, long-haul transmission systems, provisioning systems, authorization systems, and any technically feasible combination of communications and operations subsystems configured to convey data between network endpoints, such as between the wireless access point 472 and the data center 480. In one implementation, a wireless the mobile device 376 may comprise one of a plurality of wireless mobile devices configured to communicate with the data center 480 via one or more wireless access points coupled to the data network 474.

Additionally, in various embodiments, the data center 480 may include, without limitation, a switch/router 482 and at least one data service system 484. The switch/router 482 may be configured to forward data traffic between and among a network link 475, and each data service system 484. The switch/router 482 may implement any technically feasible transmission techniques, such as Ethernet media layer transmission, layer 2 switching, layer 3 routing, and the like. The switch/router 482 may comprise one or more individual systems configured to transmit data between the data service systems 484 and the data network 474.

In one embodiment, the switch/router 482 may implement session-level load balancing among a plurality of data service systems 484. Each data service system 484 may include at least one computation system 488 and may also include one or more storage systems 486. Each computation system 488 may comprise one or more processing units, such as a central processing unit, a graphics processing unit, or any combination thereof. A given data service system 484 may be implemented as a physical system comprising one or more physically distinct systems configured to operate together. Alternatively, a given data service system 484 may be implemented as a virtual system comprising one or more virtual systems executing on an arbitrary physical system. In certain scenarios, the data network 474 may be configured to transmit data between the data center 480 and another data center 481, such as through a network link 476.

Figure 5:
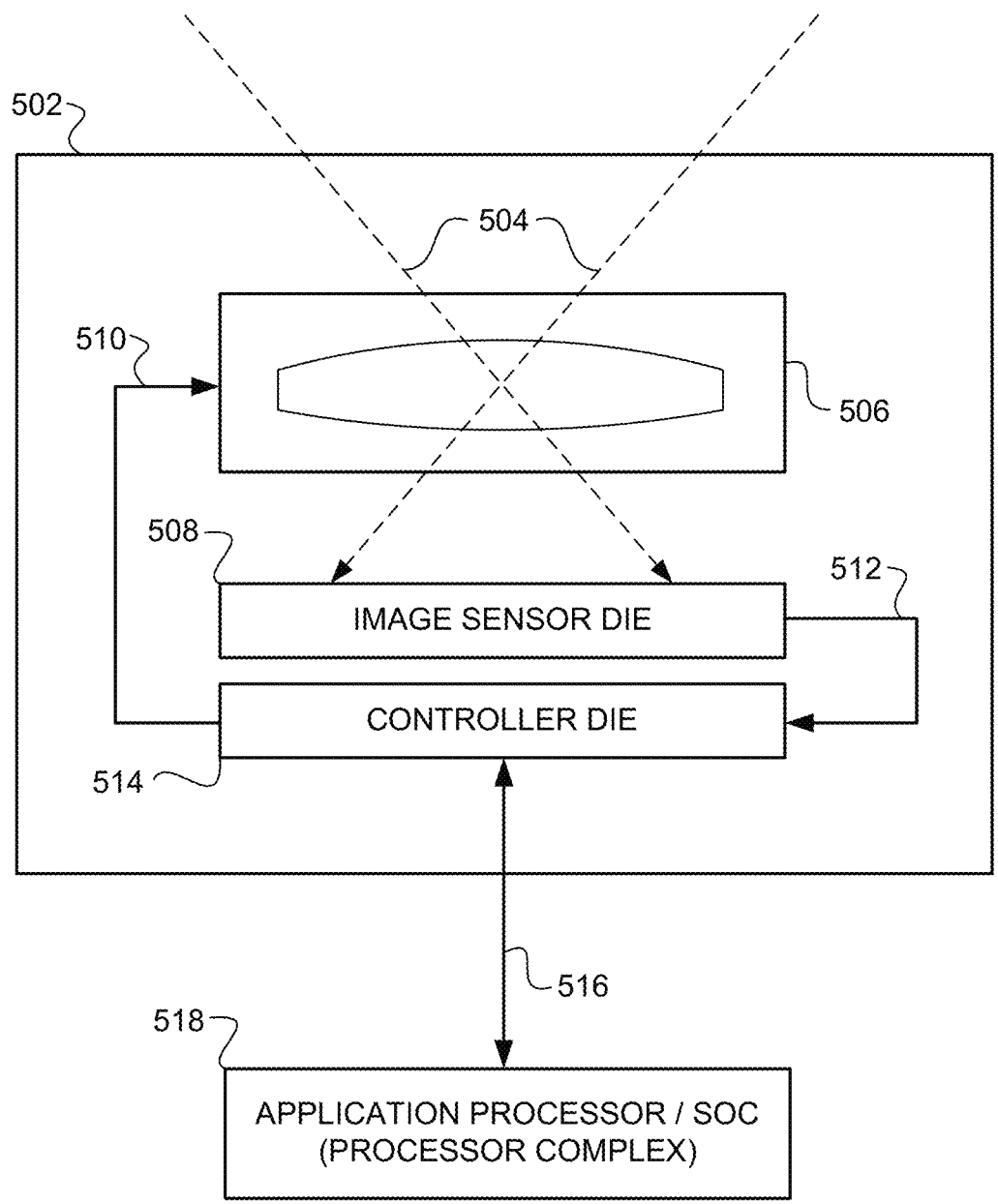
FIG. 5 illustrates a camera module in communication with an application processor, in accordance with an embodiment.

In another embodiment, the network service system 400 may include any networked mobile devices configured to implement one or more embodiments of the present description. For example, in some embodiments, a peer-to-peer network, such as an ad-hoc wireless network, may be established between two different wireless mobile devices. In such embodiments, digital image data may be transmitted between the two wireless mobile devices without having to send the digital image data to a data center 480. FIG. 5 illustrates a camera module 502 in communication with an application processor 518, in accordance with an embodiment. As an option, the camera module 502 may be implemented in the context of the details of any of the Figures disclosed herein. Of course, however, the camera module 502 may be implemented in any desired environment. Further, the aforementioned definitions may equally apply to the description below.

As shown, the camera module 502 may be in communication 516 with application processor 518. Additionally, the camera module 502 may include lens assembly 506, image sensor die 508, and controller die 514. The image sensor die 508 may receive optical scene information 504 from the lens assembly 506. Further, the image sensor die 508 may be in communication 512 with the controller die 514, and the controller die 514 may be in communication 510 with the lens assembly 506, and may be further in communication 516 with application processor 518. In one embodiment, application processor 518 may be located outside a module housing of the camera module 502.

As shown, the lens assembly 506 may be configured to focus optical scene information 504 onto image sensor die 508 to be sampled. The optical scene information may be sampled by the image sensor die 508 to generate an electrical representation of the optical scene information. The electrical representation may comprise pixel image information and pixel focus information, which may be communicated from the image sensor die 508 to the controller die 514 for at least one of subsequent processing (e.g., analog-to-digital processing) and further communication to application processor 518. In another embodiment, the controller die 514 may control storage of the optical scene information sampled by the image sensor die 508, and/or storage of processed optical scene information comprising the electrical representation.

Further, in various embodiments, the lens assembly 506 may be configured to control the focus of the optical scene information 504 by using a voice coil to move an optical element (e.g., a lens) into a focus position, a variable index (e.g. liquid crystal, etc.) optical element, or a micro-electromechanical systems (MEMS) actuator to move an optical element into a focus position. Of course, in other embodiments, any technically feasible method for controlling the focus of a lens assembly may be used. In one embodiment, controller die 514 includes a focus control system (not shown) comprising circuitry for evaluating the pixel focus information from image sensor die 508 and communicating (transmitting) focus adjustments (represented as a focus signal) to lens assembly 506 to achieve a focus goal based on focus region information transmitted from application processor 518 to the controller die 514. The focus adjustments may be determined based on a focus estimate value calculated according to techniques disclosed herein or, alternatively, calculated according to any technically feasible techniques. The focus adjustments may include a focus adjustment direction and focus adjustment magnitude, both based on the focus estimate and, optionally, at least one previous focus estimate and one corresponding focus adjustment. In another embodiment, image sensor die 508 includes the focus control system. In still yet another embodiment, a separate die (not shown) includes the focus control system. In an alternative embodiment, application processor 518 includes at least a portion of the focus control system.

In one embodiment, the controller die 514 may enable a strobe unit, such as strobe unit 336 of FIG. 3A, to emit strobe illumination 350. Further, the controller die 514 may be configured to generate strobe control signal 338 in conjunction with controlling operation of the image sensor die 508. In other embodiments, controller die 514 may sense when strobe unit 336 is enabled to coordinate sampling a flash image in conjunction with strobe unit 336 being enabled.

In certain embodiments, the image sensor die 508 may have the same capabilities and features as image sensor 332, the controller die 514 may have the same capabilities and features as controller 333, and application processor 518 may have the same capabilities and features as application processor 335.

Figure 6:
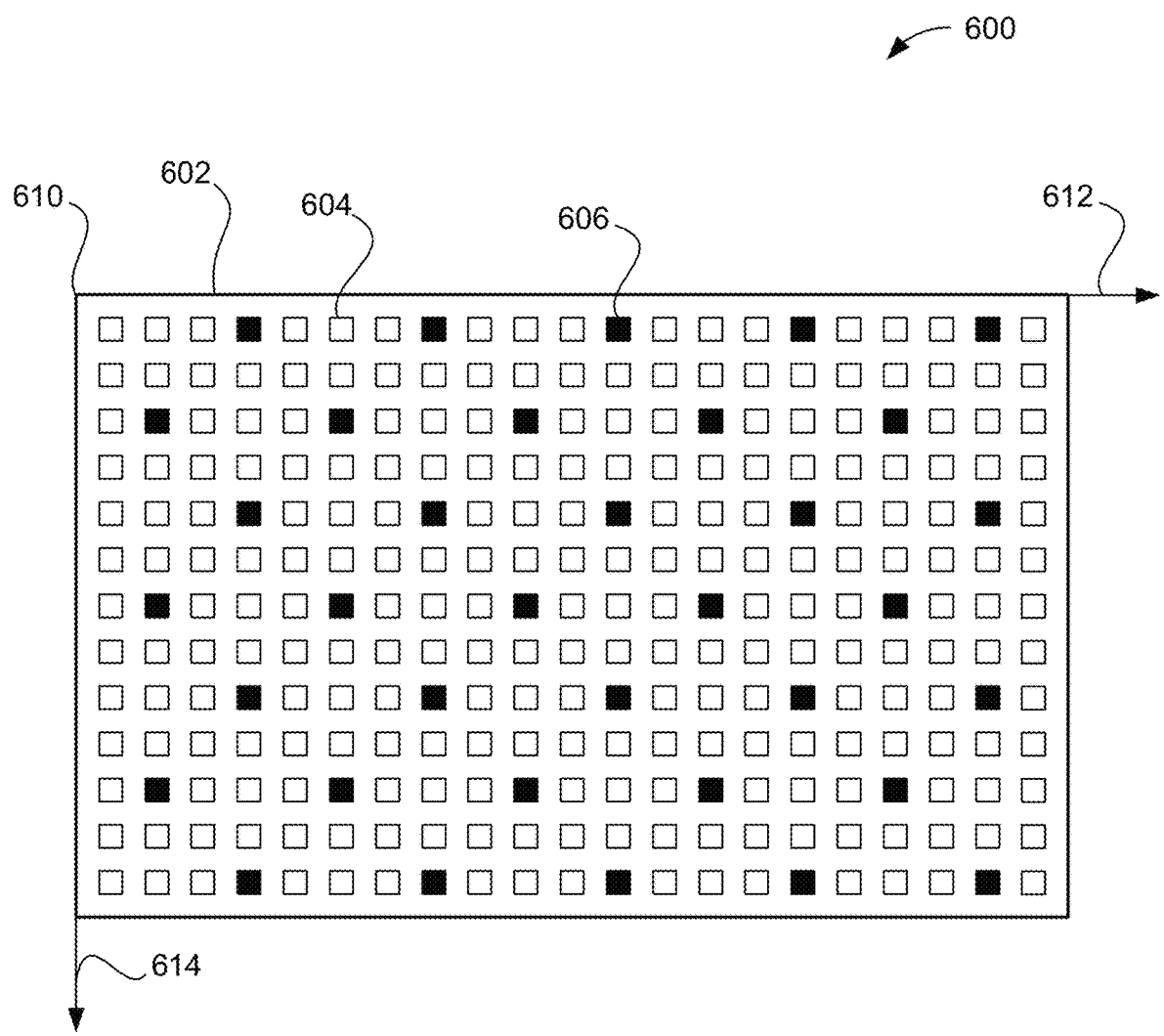
FIG. 6 illustrates an array of focus pixels within an image sensor, in accordance with an embodiment.

FIG. 6 illustrates an array of pixels 600 within an image sensor 602, in accordance with one embodiment. As an option, the array of pixels 600 may be implemented in the context of the details of any of the Figures disclosed herein. Of course, however, the array of pixels 600 may be implemented in any desired environment. Further, the aforementioned definitions may equally apply to the description below.

As shown, image sensor 602 may include color pixels, indicated as white squares, and focus pixels, indicated as black-filled squares. For example pixel 604 is a color pixel and pixel 606 is a focus pixel. Each color pixel senses light intensity (e.g., red, green, and blue components). Each focus pixel senses focus, and may also sense light intensity. In one embodiment, each pixel is a focus pixel, configured to sense both color and focus. In another embodiment, as currently shown in FIG. 6, only a subset of pixels may be used as focus pixels.

The array of pixels 600 may be organized according to a coordinate system, having an origin 610, a row dimension 614, and a column dimension 612. A given pixel within image sensor 602 may be uniquely identified based on corresponding coordinates within the coordinate system. The coordinates may include an integer address along a given dimension. Alternatively, normalized coordinates may identify a point or region within the coordinate system. While one orientation of an origin and different dimensions is illustrated, any technically feasible orientation of an origin and dimensions may be implemented without departing the scope of the present disclosure.

In various embodiments, image sensor 602 may include one of a front-lit image sensor, a back-lit image sensor, or a stacked color plane (all color pixels) in combination with a focus plane (all focus pixels) sensor die. In the context of the present description, a focus pixel is a pixel which is used at least for focusing and may also provide color or intensity information. For example, in one embodiment, a given coordinate (e.g., as indicated by a SoC) may correspond with a focus pixel, which is used as the basis for focusing optical information onto image sensor 602. Additionally, in various embodiments, focusing may include sensing contrast (e.g. contrast detection), sensing focus points (e.g. phase detection, etc.), or a combination or hybrid of one or more known techniques.

In some embodiments, light entering a lens (e.g., lens assembly 506 of FIG. 5) and focused onto image sensor 602 may arrive at a focus pixel, which may comprise a first and second photodiode (or potentially any greater number of photodiodes). Incident light at the focus pixel may arrive at different phases depending on incident angle. A phase difference detection structure provides a difference in photodiode current between the first and second photodiode when light arriving at the photodiodes is not in focus. Furthermore, the sign of the difference in current may indicate whether to adjust focus closer or further to achieve focus at the focus pixel. Each of the first and second photo diode currents may be integrated over an exposure time by an associated capacitive structure. A voltage at each capacitor provides an analog signal that may be transmitted, either as a voltage or as a current (e.g., through a transconductance circuit at the capacitor), to an analog readout circuit. Differences in the analog signal may indicate whether incident light is in focus, and if not in focus then in which direction the lens needs to be adjusted to achieve focus at the focus pixel. Difference measurements to assess focus may be performed in an analog domain or digital domain, as an implementation decision.

Of course, various embodiments may also include any number of focus pixels greater than only one, as described above. Applying the techniques set forth herein, focus for the image sensor may be adjusted associated with a selected focus pixel or focus pixels. Additionally, the image sensor may implement aspects of the adjustment of focus associated with one or more focus pixels, wherein the implementation includes determining whether the focus pixel indicates a focus condition and the camera module adjusts the lens assembly so that the focus is corrected with respect to the focus pixel. The camera module may receive focus target information (e.g. coordinates, such as those communicated to controller die 514) that are associated with one or more focus pixels and adjust lens assembly 506 to achieve focus at the one or more focus pixels. In this manner, camera module 502 may implement a closed loop focus control system for focusing images captured by the camera module. In such embodiments, focus target information comprising a given focus point, region, or weight mask may be used to specify a focus target for the focus control system. The focus target information may be provided to the focus control system by application processor 518. In one embodiment, the controller die 514 includes circuitry configured to implement the focus control system, and application processor 518 is configured to transmit focus target information to the focus control system. The focus control system may respond to receiving focus target information and/or a focus command by adjusting lens assembly 506 to focus optical scene information 504 onto the image sensor, in accordance with the focus target information. The focus control system may generate a focus signal and transmit the focus signal to lens assembly 506 to perform focus adjustments. The focus signal may represent focus and/or focus adjustments using any technically feasible techniques. In one embodiment, the focus signal may be represented as an electrical signal (e.g., voltage or current level) that directly drives an actuator for adjusting a lens position within lens assembly 506 into a focus position. In another embodiment, the electrical signal drives a variable index optical element to adjust focus. In yet another embodiment, the focus signal may encode a digital focus value used by the lens assembly to adjust focus, such as by driving an actuator or variable index optical element.

In one embodiment, an application processor (e.g., application processor 518) may be relied upon to provide focus target information comprising a point, a point with a radius, a point with a radius and a weight profile, a region of weights around a point of interest, or a weight mask, such that the identified focus target information (of where to focus) has been determined. A given weight (focus weight) may provide a quantitative indication of how much influence focusing at an associated focus target information should have in an overall focus distance for the camera module. Once such a determination is completed, the camera module may then proceed with adjusting the focus associated with the focus target information as given by the application processor (e.g. SoC, etc.). Adjusting the focus may proceed as a sequence of focus adjustment iterations, wherein at each iteration a focus estimate is generated based on focus target information and measured focus information; the focus control system then adjusts focus according to the focus estimate.

Further, in certain embodiments, a focus pixel(s) may be implemented as one channel (e.g. green) of an R-G-G-B (red-green-green-blue) pixel pattern. Of course, any of the color channels, including a color channel having a different color than red, green, or blue may be used to make a focus pixel. A given focus region may have focus target information that corresponds to a given focus pixel or set of focus pixels.

In another embodiment, every pixel may function as a focus pixel and include two photodiodes configured to detect a phase difference in incident light. In such an embodiment, each pixel may generate two intensity signals for at least one intensity sample (e.g., one of two green intensity samples), wherein a difference between the two intensity signals may be used for focus, and one or a combination of both of the intensity signals may be used for color associated with the pixel.

Still yet, in another embodiment, a camera module may include dual photo detecting planes, one for focusing and another for creating the image. As such, a first photo detecting plane may be used to focus and a second photo detecting plane may be used to create an image. In one embodiment, the photo detecting plane used for focusing may be behind the first photo detecting plane (e.g. which gathers color, etc.).

In one embodiment, one or more selected focus pixels residing within image sensor die 508 provide focus information (e.g., phase difference signals) to circuits comprising a focus control system residing within controller die 514. The one or more selected focus pixels are selected based on focus target information (e.g. coordinates) associated with focus regions identified by application processor 518. Various techniques may be implemented by the application processor 518 to identify the focus regions, the techniques including, without limitation, automatically identifying objects within a scene and/or receiving explicit user input that initially identifies one or more objects within a scene by providing a touch input on a touch input device.

Figure 7:
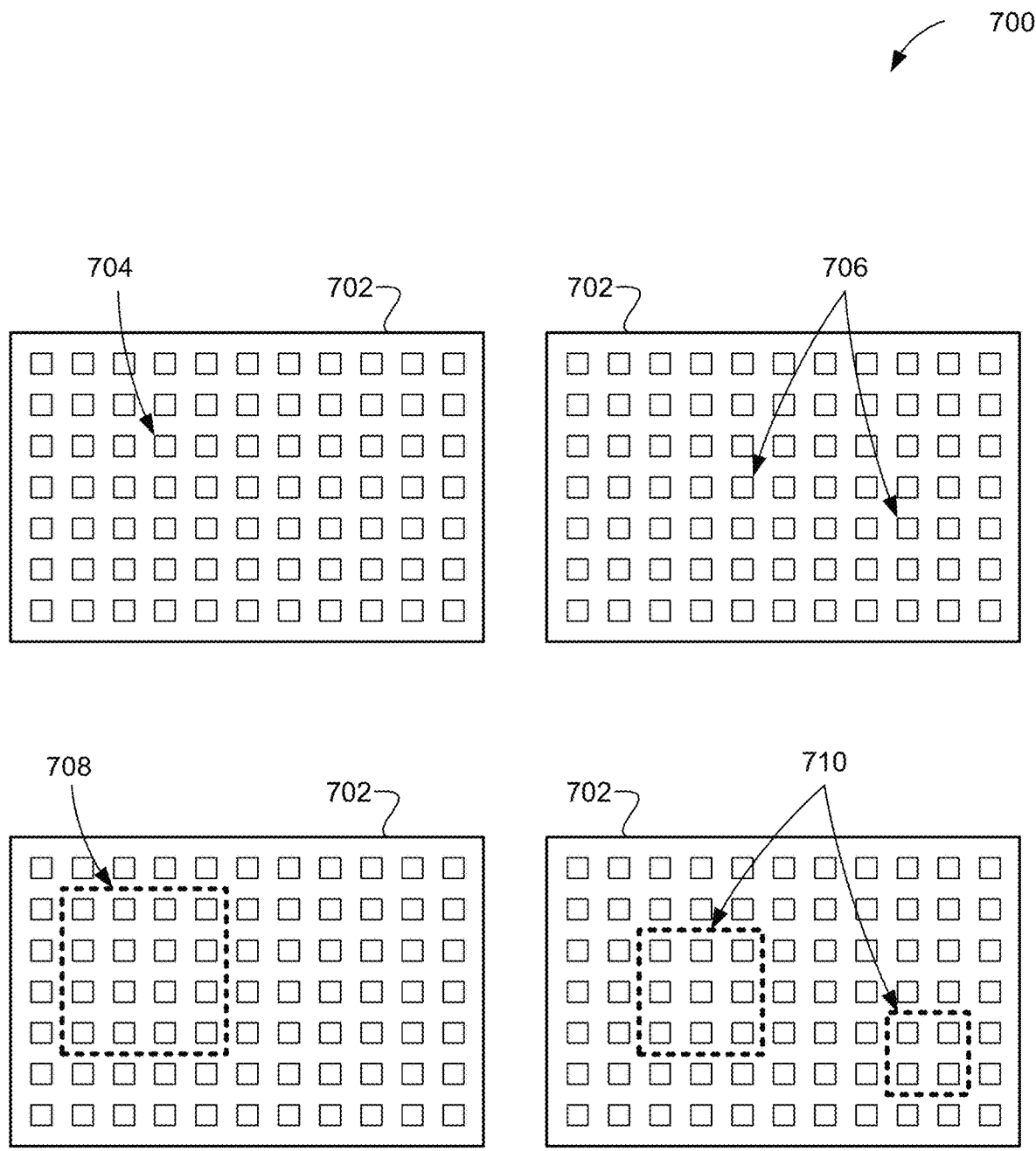
FIG. 7 illustrates an array of focus pixel point(s) and focus region(s) within an image sensor, in accordance with an embodiment.

FIG. 7 illustrates arrays of focus pixels and focus regions 700 within an image sensor 702, in accordance with an embodiment. As an option, arrays of focus pixels and focus regions 700 may be implemented in the context of the details of any of the Figures disclosed herein. Of course, however, arrays of focus pixels and focus regions 700 may be implemented in any desired environment. Further, the aforementioned definitions may equally apply to the description below.

As shown, image sensor 702 may include a focus point 704, focus points 706, focus region 708, and/or focus regions 710. In one embodiment, a focus point (or points) is a specific pixel(s) that is selected as a focus pixel. In another embodiment, a focus region (or regions) may include a collection of many pixels (e.g. a N×N pixel region), wherein at least some of as the pixels are focus pixels. Each pixel may have an associated point location or pixel point.

Additionally, in one embodiment, a focus region(s) may include one or more implicit or explicit weights. Further, various shapes (e.g. a circular shape) may define a focus region. For example, a circular region (rather than an N×N rectangular or square region) may be implemented by assigning weights of 0 to corners of an N×N region.

In various embodiments, the focus point(s) and/or focus region (s) may be defined by user interaction. For example, in one embodiment, a user may touch on a region (e.g. on a display unit associated with an application processor), and the application processor may associate focus target information for that region to a focus region used by the camera module to maintain focus. In another embodiment, a user may touch on a region on the display unit, and the application processor may identify an object in the region, so that the object is continuously tracked by the application processor and the camera module continuously keeps the image information associated with the object focus target information (e.g. coordinate(s)) in focus. In this manner, the application processor (e.g. SoC, etc.) performs object tracking and/or pixel flow tracking to continuously track and update a focus region or regions, and the camera module maintains continuous focus based on focus target information and/or coordinates associated with the continuously updated focus region or regions.

Figure 8:
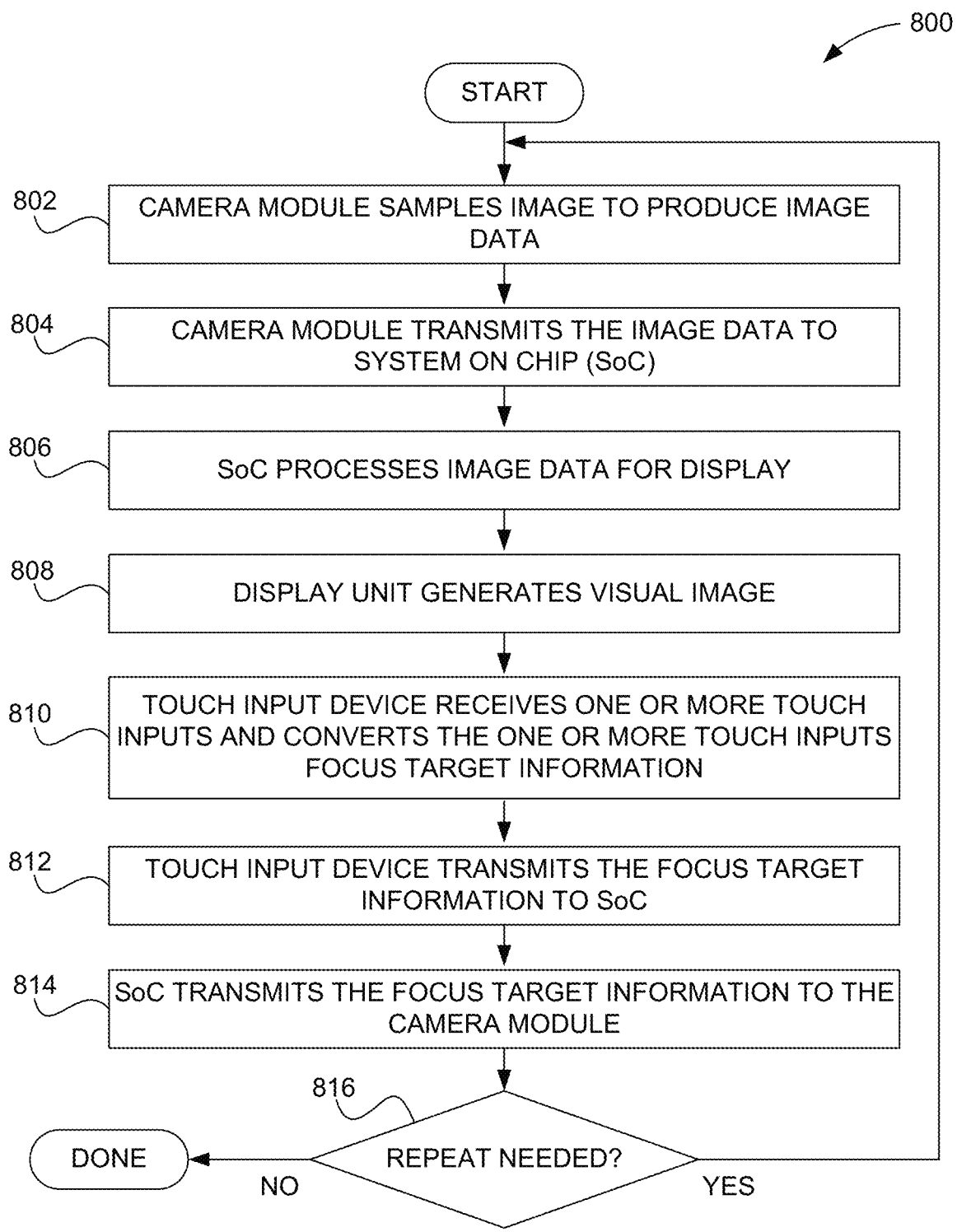
FIG. 8 illustrates a method for adjusting focus based on focus target information, in accordance with an embodiment.

FIG. 8 illustrates a method 800 for adjusting focus based on focus target information, in accordance with an embodiment. As an option, the method 800 may be implemented in the context of the details of any of the Figures disclosed herein. Of course, however, the method 800 may be implemented in any desired environment. Further, the aforementioned definitions may equally apply to the description below.

As shown, a camera module samples an image to produce image data. See operation 802. Additionally, the camera module transmits the image data to a system on a chip (SoC). See operation 804. Of course, in other embodiments, the camera module may transmit the image data to any type of application processor.

In operation 806, the SoC processes image data for display. Next, a display unit, such as display unit 312 of FIG. 3A, generates a visual image. See operation 808. In one embodiment, the visual image may include multiple frames (e.g. a real-time view of what is being received by the camera module and sent to the SoC). Further, a touch input device receives one or more touch inputs and converts the one or more touch inputs to corresponding focus target information (e.g. input coordinates). See operation 810.

As shown, the touch input device transmits the focus target information to the SoC. See operation 812. For example, in one embodiment, a touch input comprises a user touching an image displayed on the display unit, the display unit being coupled to a touch input device that is configured to detect touch gesture locations on the displayed image. In response, the SoC may determine the touch location to establish focus target information.

Additionally, the SoC transmits the focus target information to the camera module. See operation 814. Further, it is determined whether a repeat is needed. See decision 816. If a repeat is needed, then the method starts again at operation 802. If a repeat is not needed, then the method ends. In one embodiment, a repeat may be needed if additional image captures are desired. In certain embodiments, the SoC transmits region and/or focus mask information to the camera module to serve as focus target information, and the one or more focus target information may identify centers for one or more focus regions.

In one embodiment, the touch input is converted to focus target information which may be used to select a focus point. The focus point (e.g. coordinate location, coordinates, etc.) may then be sent to the camera module to adjust the focus as needed for the corresponding focus pixel(s).

In another embodiment, multiple focus points or regions may be selected by the user, and multiple coordinates may be sent to the camera module. For example, a photographic scene may include a tree in the foreground and a stream in the background. The user of the camera may indicate via touch input that both the tree in the foreground and the stream in the background are to be in focus, and such coordinates associated with the touch input may be sent to the camera module to adjust focusing. In one embodiment, the camera module may capture a sweep of focus between a first coordinate and a second coordinate. For example, the tree may correspond with a first coordinate (e.g. first focus point) and the stream may correspond with a second coordinate (e.g. second focus point), and the camera module may adjust the focus from the first coordinate to the second coordinate, while capturing multiple frames of scene information from the first coordinate to the second coordinate.

In one embodiment, sweeping between a first coordinate and a second coordinate may be used to create a blended image between a first object and a second object. For example, a sweep between a first coordinate and a second coordinate may correspond to a sweep in focus distance between two different focus distances. A sequence of images may be captured between the two different focus distances to generate an image stack of images each having a different focus distances. Techniques known in the art as focus stacking, focal plane merging, z-stacking, or focus blending may be implemented to generate the blended image. Alternatively, the image stack may be preserved to allow a user to select a focus distance and/or focus depth after capturing the image stack. In certain embodiments, each image in the image stack is subjected to an alignment step with respect to a reference image, an aligned version of each image is then stored within the image stack. In one embodiment, a blended image may include at least two focus points and at least two time points, wherein image data associated with the first focus point and first time point is blended with image data associated with the second focus point and the second time point. Of course, any number of coordinate points (i.e. focus points/regions, etc.) and time points may be used for a blended image. In one embodiment, blending at least two image data (e.g. associated focus/time points) may include showing in focus the indicated focus point(s) and then blending (e.g. merging image data) between data associated with the indicated focus point(s) and data associated with non-focus point(s). Additionally, in one embodiment, a blended image may include multiple captures by the camera module, which may be configured to sequentially and independently generate image data for the multiple captures.

Further, in another embodiment, a stack of images may be used to create a synthetic aperture image. For example, in one embodiment, a macro lens may be used to capture a close-up image of an object, wherein the object is indicated to be a focus region. In such an embodiment, the focus plane may be shifted closer and further from an identified focus point to ensure that the entire image is in focus, with the resulting image stack being blended to create a uniformly focused image wherein the entire selected focus region (i.e. the object) is completely in focus. In this manner, using the SoC to identify a focus region, and using the camera module to capture an image stack comprising of multiple images (each at a separate focus plane) may ensure that a blended image of the focus region is entirely in focus.

Still yet, in various embodiments, being able to track (using the SoC) and focus (using the camera module) quickly may have relevancy and applicability to many industries. For example, objects in fast motion photography (e.g. sports, cars, young children) may be accurately tracked by the SoC with focus maintained by the camera module. Additionally, such an approach may also be of use to augmented reality or virtual reality where a user's actions may be tracked (again, by the SoC) and displayed (in focus by the camera module) on an associated screen.

In one embodiment, the focus target information transmitted to the camera module may include, without limitation, one of four coordinate types associated with a coordinate system that maps to a field of view for the camera module: 1) one or more point(s) in a list of points; 2) one or more point(s) with an implicit or specified radius around each point and/or weight profile for each point; 3) as one or more point(s) within a weight mask; and 4) as a 2D mask of values for each discrete location covered by the 2D mask. In one embodiment, one or more of such coordinate types may be saved as metadata associated with the image, thereby recording focus point information for the image. Further, such saved metadata may be reused as needed (e.g. fetched and applied) to other subsequently captured images and/or video footage.

In another embodiment, the one or more point(s) may correspond with a specific one or more focus pixel point(s) having associated coordinates within the coordinate system. In another embodiment, the one or more point(s) with radius and/or weight profile may correspond with a specific one or more focus pixel region(s). Still yet, in one embodiment, a weight profile may include a start point and an end point, with a predefined function to be applied between the two points. For example, in a coordinate including a point plus a radius, the radius may include a weight profile, wherein the weight profile determines the weights that are to be applied at each point along the radius. The radius may define a dimension of a geometric region (e.g., a circular, elliptical, or rectangular region) encompassing a point, wherein non-zero weights are defined within the region. Furthermore, an implicit or explicit weight profile may define weight values within the geometric region based on a radial distance from the point or based on a geometric relationship relative to the point. For example, a weight profile may define a weight of 1.0 at the point and a linear reduction in weight to a value of 0.0 at a distance of the radius. Persons skilled in the art will recognize that any and arbitrary weight profiles are also possible. In another embodiment, a weight mask includes a weight matrix, wherein the weight matrix includes a specific weight to be applied at each coordinate point. A weight mask provides a general and easily implemented construct for applying a set of focus weights at the camera module, while a point and weight profile may provide a less general but more compact representation for transmission to the camera module.

The weights, either explicitly stated by focus points or a weight mask, or implied by a radius and/or weight profile, establish a focus estimate contribution to a focus cost function. In one embodiment, the focus cost function serves to estimate how well a focus goal is presently being achieved. In certain embodiments, a focus control system residing within a controller die 514 of FIG. 5 or within controller 333 of FIG. 3G receives one or more focus points and focus weights. The focus control system computes the focus cost function based on the focus points and focus weights. The focus control system then adjusts a lens in a direction appropriate to reducing the cost function. New focus information is available s focus is adjusted, and with each new adjustment focus pixels may be sampled again and a new focus cost function may be calculated. This process may continue for an arbitrary duration, with focus constantly being adjusted and updated. In one embodiment the focus cost function is defined to be a sum of focus pixel phase difference values, each multiplied by a corresponding focus weight. Of course, other focus cost functions may also be implemented without departing the scope of embodiments of the present disclosure.

In this manner, the focus target information (e.g. coordinates) transmitted to the camera module may have varying degrees of detail and varying degrees of data which is transmitted. For example, transmitting one or more points would include less data than one or more points with radius and/or weight profiles, which would include less data than one or more points with weight mask. As such, the coordinate type may be selected based on the needs of the user and/or system.

Additionally, in one embodiment, a weight profile may be implied or explicit (e.g. stated). For example, a weight profile which is implied may include a profile which references the same profile. In one embodiment, an implied profile may remain the same (i.e. it cannot be changed). In another embodiment, an implied profile may include use of a set pattern (e.g. circle, rectangle, etc.). Additionally, a weight profile which is explicit may include a profile where weights are referenced every time the weight profile is requested or transmitted.

Still yet, in one embodiment, a weight mask may be explicit, and/or stored and indexed. For example, a weight mask which is explicit would include a mask which is referenced every time the mask is requested or transmitted. A mask which is stored and indexed, however, is where a mask is previously created and stored, and at a later time, may be referenced in relation to the scene which is being captured (e.g. apply mask index MM to focus point XY, etc.). In this manner, a previously created mask may be retrieved and applied to the indicated focus point.

In one embodiment, information (e.g. metadata) associated with a prior capture may be applied to subsequent frames. For example, in various embodiments, weight profiles and weight masks selected for a first image may be applied to a subsequent image(s). In some instances, a high number of frames may be received (e.g. rapid fire capture, video, etc.) such that previously selected weight profiles and weight masks may be applied to subsequent frames. Furthermore, the information may be associated with one or more focus points, and the coordinates of the one or more focus points may change during the course of capturing the frames or subsequent frames. Of course, in some embodiments, weight profiles and weight masks (as well as any one or more points) may be modified as desired to be applied to the current and subsequent frames.

Figure 9:
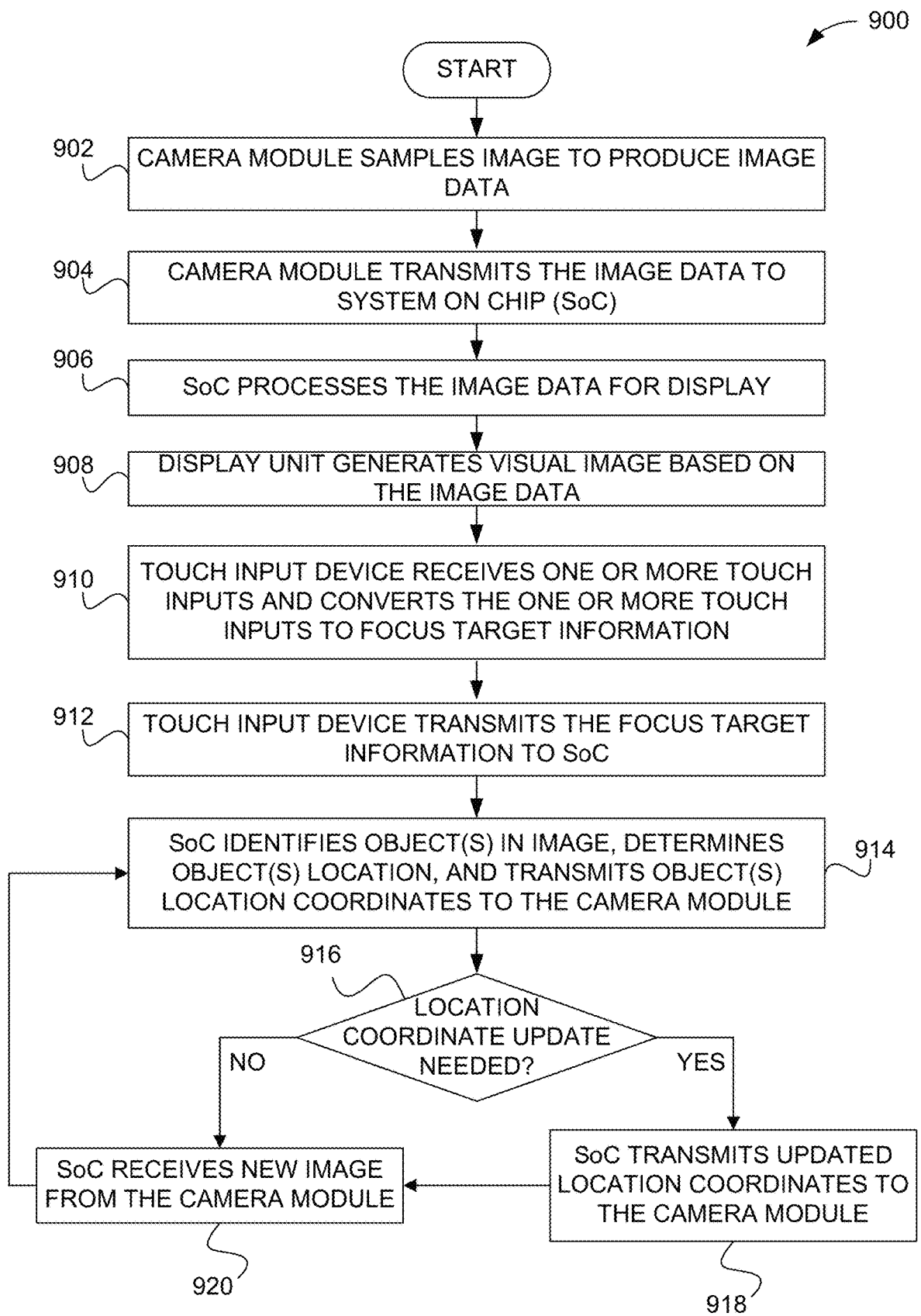
FIG. 9 illustrates a method for adjusting focus based on focus target information, in accordance with an embodiment.

FIG. 9 illustrates a method 900 for adjusting focus based on focus target information, in accordance with an embodiment. As an option, the method 900 may be implemented in the context of the details of any of the Figures disclosed herein. Of course, however, the method 900 may be implemented in any desired environment. Further, the aforementioned definitions may equally apply to the description below.

As shown, a camera module samples an image to produce image data. See operation 902. Additionally, the camera module transmits the image data to a system on a chip (SoC). See operation 904. Of course, in other embodiments, the camera module may transmit the image data to any type of application processor.

In operation 906, the SoC processes the image data for display. Next, the display unit generates a visual image based on the image data. See operation 908. In one embodiment, the visual image may include multiple frames (e.g. a real-time view of what is being received by the camera module and sent to the SoC). Further, a touch input device receives one or more touch inputs and converts the one or more touch inputs to focus target information (e.g. one or more input coordinates). See operation 910.

As shown, the touch input device transmits the focus target information to SoC. See operation 912. For example, in one embodiment, a user may touch an image being generated by the display unit, and in response, the SoC may determine the touch location to establish focus target information (input coordinate(s)).

Additionally, the SoC identifies object(s) in the image, determines the object(s) location, and transmits object(s) location coordinates to the camera module. See operation 914. Next, it is determined whether a location coordinate update is needed. See decision 916. If it is determined that a location coordinate update is needed, the SoC transmits updated location coordinates to the camera module. See operation 918. If it is determined that a location coordinate update is not needed or after the SoC transmits updated location the camera module, the SoC receives a new image from the camera module. See operation 920. After the SoC receives the image from the camera module, the method returns to operation 914.

In one embodiment, the SoC may track (e.g. pixel flow, object motion tracking, etc.) an identified object, or image region. For example, in one embodiment, a user may select a pen tip as displayed in an image as a point of focus. As shown in decision 916, it is determined whether a location coordinate update is needed. Therefore, the pen tip is tracked as it may move on the screen. The tracking effort occurs in the SoC. When the pen tip is initially identified as a focus point of interest, a location update is needed and the method proceeds to operation 918. Upon receiving updated location coordinates, the camera module begins maintaining focus at the location coordinates. If the pen tip has not moved since being initially identified as a focus point of interest, then the location coordinates already being used by the camera module to identify a focus region still represent the focus point of interest, and the camera module can continue to correct the focus as needed, and complete the capture (if desired) of the image. If the pen tip has moved, then the updated location coordinates are sent to the camera module, which can then correct the focus as needed, and complete the capture (if desired) of the image. In this manner, the control loop tasked with maintaining focus location ("did the object move?") occurs in the SoC, and the control loop tasked with maintaining focus at the focus location ("is it in focus?") occurs in the camera module.

Additionally, in one embodiment, the identified object may include object verification. For example, in one embodiment, the angle of the pen tip may change. As such, the location coordinates associated with the identified object may needed to be updated. Additionally, the new angle of the object may need to be verified to ensure that it still corresponds to the identified and tracked object. For example, a pen may be held horizontally such that the pen tip extends to one side. The pen, however, may be moved such that the pen tip faces the camera face-on, meaning that the length of the pen is no longer seen but only the very tip and the width of the pen is now displayed. In such an embodiment, the object may be verified to ensure that the previously identified pen tip still corresponds with a pen tip.

In one embodiment, if the perspective or angle of the identified object has changed, the method may include determining whether a threshold of change has been exceeded. For example, if the change in perspective is minimal, then object verification may not be needed. However, if the change in perspective is great (e.g. as in the case of a pen length versus face-on), then object verification may be appropriate.

Additionally, in one embodiment, a set of pixels associated with the identified object may be used as the basis for a threshold associated with determining whether a location coordinate update is needed. For example, each new iteration of identifying the object may include identifying the new set of pixels associated with the object. If a percentage of the new set of pixels matches the old set of pixels, then a location coordinate update may not be needed. Conversely, however, if the new set of pixels does not match the old set of pixels, or if the pixel motion is detected in scene content associated with the location, then a location coordinate update may be needed. As such, object identification may include identifying a set of pixels associated with the identified object and using such set of pixels as the basis for determining whether a location coordinate update is needed. Alternatively, motion estimation techniques may be implemented to determine the set of pixels and whether a location coordinate update is needed. In one embodiment, a new iteration may be performed with each new preview frame in a live preview mode. In another embodiment, a new iteration may be performed for each new frame of video information being captured.

In one embodiment, if a threshold has been exceeded, a warning may be given. For example, a warning "Is this the same object" may be displayed requesting feedback from a user. Furthermore, if an object is no longer visible (e.g., a user turned the camera, or the object moved off-scene) then a focus point of interest based on the object may be lost and the user notified. In one embodiment, the camera module may continue to focus at the last known location. In another embodiment, if the object is no longer visible or motion estimation fails, then the camera module refocuses on the overall scene.

Further, in some embodiments, object verification may include relying, at least in part, on resources associated with other devices. For example, in various embodiments, pixel and/or image data associated with the identified object may be sent to a separate server that is configured to identify the object. In some embodiments, relying on resources associated with other devices may occur synchronously or asynchronously. For example, a synchronous communication would allow the camera device to identify and track an object, with real-time results of the object identification being displayed. In one embodiment, the synchronous communication may cause the camera device to be dependent on other devices to proceed forward (i.e. object may need to be fully identified before proceeding forward). Conversely, an asynchronous communication would allow the camera device to identify and track an object, with results of the object identified being displayed at whatever point the other devices makes the determination. In this manner, an asynchronous communication would allow for the camera device to continuously monitor and track the identified object, with the actual object identification being received at whatever point it is completed. In one embodiment, the object identification may be received after the camera device has completed the capture of the image. In other embodiments (e.g. video, rapid fire still images), as the frames are captured, object identification may be displayed which may allow for more accurate tracking of the object throughout the recording.

In another embodiment, an indication of object identification (or loss of identification) may be displayed on the display unit. For example, once an object has been identified, the object may include a focus box (or some visual identification, such as a green box around the object) which indicates that an object has been identified and is being tracked. In like manner, if the object identification has been lost, then the focus box may disappear, change color (e.g. turn from green to red, etc.), or otherwise provide some notification to the user (e.g. display "the previously identified object is no longer available. Please select object to track", etc.).

Figure 10:
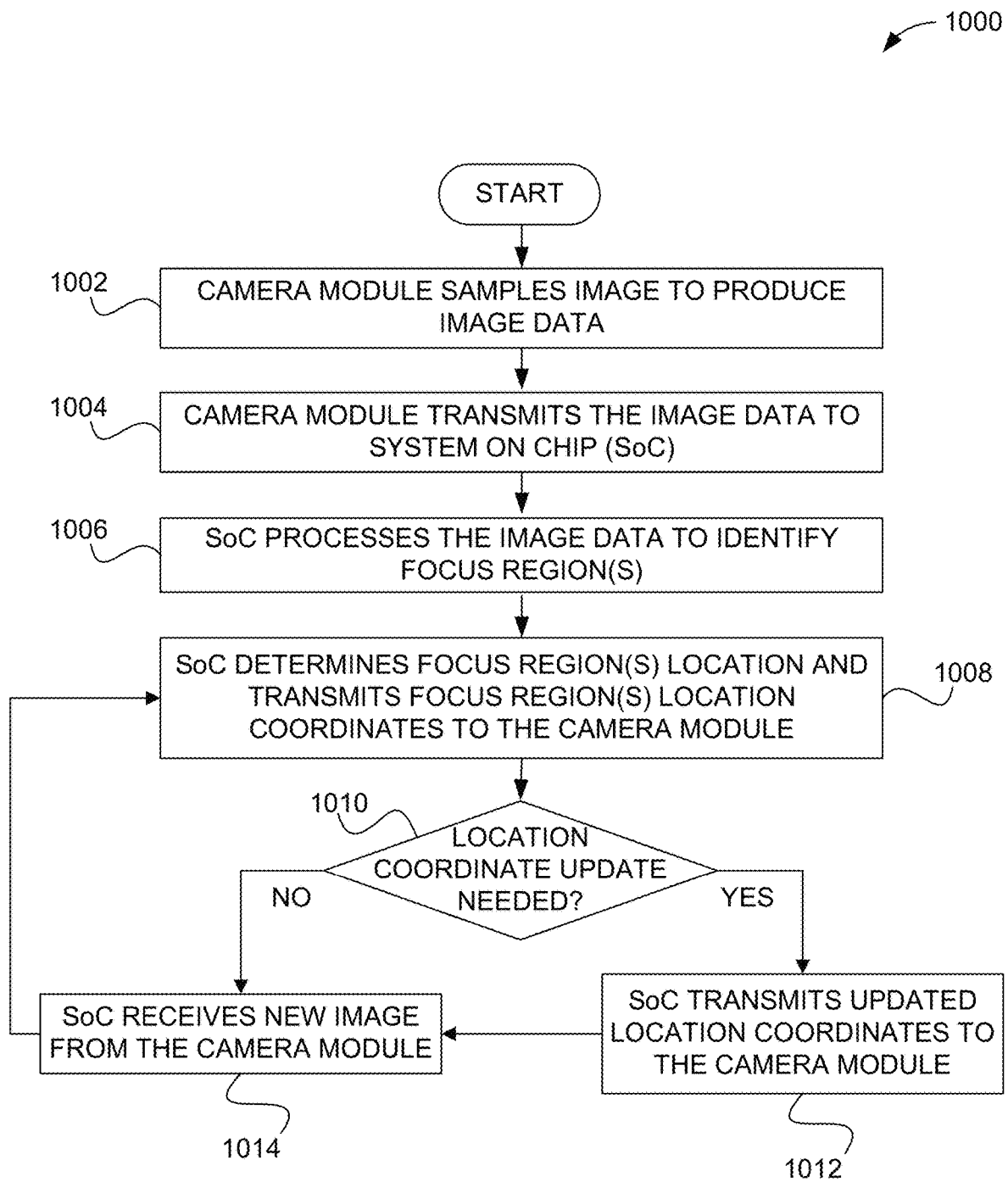
FIG. 10 illustrates a method for adjusting focus based on focus target information, in accordance with an embodiment.

FIG. 10 illustrates a method 1000 for adjusting focus based on focus target information, in accordance with an embodiment. As an option, the method 1000 may be implemented in the context of the details of any of the Figures disclosed herein. Of course, however, the method 1000 may be implemented in any desired environment. Further, the aforementioned definitions may equally apply to the description below.

As shown, a camera module samples an image to produce image data. See operation 1002. Additionally, the camera module transmits the image data to a system on a chip (SoC). See operation 1004. Of course, in other embodiments, the camera module may transmit the image data to any type of application processor.

In operation 1006, the SoC processes the image data to identify focus region(s). Next, the SoC determines the focus region(s) location, and transmits focus region(s) location coordinates to the camera module. See operation 1008. Next, it is determined whether a location coordinate update is needed. See decision 1010. If it is determined that a location coordinate update is needed, the SoC transmits updated location coordinates to the camera module. See operation 1012. If it is determined that a location coordinate update is not needed or after the SoC transmits updated location coordinates to the camera module, the SoC receives a new image from the camera module. See operation 1014. After the SoC receives the image from the camera module, the method returns to operation 1008.

In one embodiment, when the SoC processes the image data to identify object(s), the SoC may also determine which object(s) have the greatest likelihood of being the object of focus. In one embodiment, a known object may have a priority ranking that is higher than another identified object. For example, a photo may include a user's face and a flower. Both identified objects may be associated with a ranking score such that the priority is given to the face to ensure that the face is in focus. In some embodiments, a sweep of multiple images may be captured such that any object which is identified may be separately focused and captured, and the outputted or otherwise displayed image may be a blend of the image stack such that a blended photo for display includes each and every identified object in focus. Alternatively, a user may select which object or objects should be in focus and a corresponding image or images from the image stack may be displayed or blended for display.

In another embodiment, the SoC may have a library of stored information to assist in identifying an object. For example, information relating to a generic eye, nose, or mouth, may assist with determining that a face is present in the image. Or, information relating to a generic structure of a cat, cow, or any animal, may assist in determining an inanimate versus animate object.

Further, in one embodiment, multiple objects may be identified. For example, in one embodiment, a photo may include ten individuals with ten separate faces, each of the faces with a displayed notification around it (e.g. green box) indicating that an object has been identified. In one embodiment, ten separate captures may be obtained with a separate focus for each one, each of the captures having a designated face in focus. The image stack may then be blended such that each of the ten faces is shown in focus. In such an embodiment, the captured photos may be obtained in a rapidly-sequenced acquisition, wherein any lag-time is minimized to prevent any distortion (e.g. blurring) of the outputted image. In one embodiment, in the event that there is some change from the first captured photo to the last captured photo, an alignment step may be performed in ensuring that all of the imaged being blended are aligned properly, at least at their respective focus points of interest, and a normalization may ensure that lighting and color is consistent from one captured image to the next during a blend operation.

In one embodiment, ensuring that the focus can occur faster (by hardware within the camera module) may allow for more precise image stabilization. For example, if the stabilization method (e.g. as found in the SoC, etc.) relies on pixel movement, the pixels being displayed and sent to the SoC may be more crisp and in-focus which would allow for more precise application of a stabilization system.

Additionally, in one embodiment, tracking the object(s) location in the SoC and adjusting the focus in the camera module may improve focus in video mode. For example, objects frequently will move as a video is recorded. However, the SoC only needs to track the object (e.g. either identified automatically or via user input) and transmit the location coordinates to the camera module, wherein once the location coordinates change, then the camera module updates the focus point.

Still yet, in one embodiment, having more than one photodiode (and capacitor structure) associated with each color channel of each pixel may allow use of a focus pixel associated with an image grid which is sparser than a full image sensor grid. Additionally, in one embodiment, such a capability (multiple image planes) may allow for HDR capture, wherein one plane is used for focus information, and two or more additional planes are used for HDR capture.

In one embodiment, at least a majority of pixels within an image sensor comprising the camera module implements a focus pixel. For example, in an image sensor having a Bayer red-green-green-blue filter per pixel, a first of the two green channels at each pixel may implement a focus pixel configured to provide two or more focus detection outputs in the form of phase detection samples. This first green channel may be referred to herein as a focus channel. In alternative embodiments, a different filter color including clear may be selected for the focus channel. The remaining red, green, and blue channels at each pixel may be referred to herein as image channels. Each pixel therefore may provide two or more samples (phase detection samples) of focus channel information, and three or more channels (red, green, blue intensity) of image channel information. The image sensor may include a two-dimensional (2D) array of pixels, and focus channel information associated with the 2D array of pixels may be referred to herein as a focus array, while corresponding image channel information may be referred to herein as an image array. Focus points, focus regions, focus maps, and coordinates associated thereto may be mapped to a 2D extent of the image array. In certain embodiments, focus pixels are more sparsely distributed over the image sensor, but a comparable coordinate mapping may nonetheless be made.

In one embodiment, the focus array and image array are sampled (exposed) concurrently. In such an embodiment, intensity information sampled by the focus array may be blended with image data sampled by the image array. For example, the focus array intensity information may be added together and treated as a second green channel per pixel. In another embodiment, the focus array may be exposed for a longer duration or a shorter duration than the image array. For example, the focus array may be exposed for a longer exposure time than the image array in a low-light setting for better focus performance, but the image array may be sampled for a shorter exposure time at a higher sensitivity (ISO) to reduce shake, while accepting image chromatic noise as a quality trade off.

In one embodiment, exposure time and sensitivity for the focus array may be metered to achieve balanced exposure ("EV 0") over a whole scene. Alternatively, exposure time and sensitivity for the focus array may be metered to achieve balanced exposure within focus one or more regions while generally excluding regions outside the focus regions.

In certain embodiments, the image array includes two or more analog storage planes, each having separately configured exposure time and/or sensitivity from the other. Furthermore, the exposure time and timing for each analog storage plane may be independent of the exposure time and timing of the focus array. In certain embodiments, image channel and focus channel circuits for each pixel include two photodiodes, and two analog sampling circuits. Furthermore, in focus channel circuits, one of the two analog sampling circuits is configured to integrate current from one of the two photodiodes to generate a first analog intensity sample, and the other of the two analog sampling circuits is configured to integrate current from the other of the two photodiodes to generate a second analog intensity sample. In image channel circuits, both photodiodes may be coupled together to provide a photodiode current to two different analog sampling circuits; the two different analog sampling circuits may be configured to integrate the photodiode current independently. The two different analog sampling circuits may integrate the photodiode current simultaneously and/or separately. In other words, intensity samples associated with the focus channel should be integrated simultaneously to generate focus information at the pixel, while intensity samples associated with the image channel may be integrated independently to generate independently exposed intensity samples.

In certain embodiments, an image sensor includes a 2D array of pixels, wherein each pixel includes an analog sampling circuit for capturing focus information and two or more analog sampling circuits per color channel for capturing image information (e.g., two or more analog sampling circuits for each of red, green, blue). In such embodiments, a first analog storage plane comprises instances of a first of two or more different analog sampling circuits at corresponding pixels within the array and associated with the image channel, and a second analog storage plane comprises instances of a second of two or more different analog sampling circuits at the pixels and also associated with the image plane. In certain embodiments, readout circuits for selecting and reading rows of image channel samples may be configured to also select and read rows of focus channel samples.

Still yet, in certain related embodiments, an ambient image (strobe unit turned off) may be captured within the first analog storage plane and a flash image (strobe unit turned on) may be captured within the second analog storage plane. Capture of the ambient image and the flash image may be non-overlapping in time or overlapping in time. Alternatively, two flash images may be captured in each of the two different analog storage planes, with each of the two flash images having different exposure times. In such embodiments, the camera module may be configured to establish focus based on specified focus points and/or regions (focus information), with or without the strobe unit enabled.

Still yet, in one embodiment, the camera module is directed to capture a flash image based on specified focus information. In response, the camera module may perform exposure metering operations to establish an appropriate exposure for at least focus pixels and subsequently proceeds to achieve focus based on the focus information. The camera module then captures the flash image after focus is achieved. Capturing the flash image may proceed once the focus control system has achieved focus, and without waiting for the SoC or application processor, thereby reducing power consumption and shutter lag. In one embodiment, the camera module captures a sequence of flash images after focus is achieved. Each flash image in the sequence of flash images may be captured concurrently with an accelerometer measurement that captures camera motion as an estimate for image blur. A flash image with minimal estimated image blur is stored and/or presented to a user, while the other flash images may be discarded. Alternatively, each flash image in the sequence of flash images may be stored and/or presented.

Still yet, in another embodiment, the camera module is directed to capture an image stack of two or more images, the images corresponding to available analog storage planes within the camera module image sensor. Each of the two or more images may be an ambient image, a flash image, or a combined image. Each of the two or more images may be specified according to focus information and/or exposure information. Capture of each image may overlap or not overlap with the capture of other images in the image stack. Capturing the image stack may proceed once the focus control system has achieved focus, and without waiting for the SoC or application processor.

In one embodiment, a first camera module comprises an image sensor configured to include at least one focus pixel, and may include a focus array, while a second camera module comprises an image sensor that does not include a focus array. The first camera module and the second camera module may be included within the same device, such as a mobile phone device. The first camera module may be configured to perform focus operations described herein, while the second camera module may be configured to operate in a tracking mode that dynamically tracks a focus distance determined by a focus control system within the first camera module.

In one embodiment, a mobile device includes two or more camera modules, each configured to independently maintain focus on a respective focus region or regions provided by an SoC (or any other form of application processor) coupled to the two or more camera modules. The two or more camera modules may be substantially identical in construction and operation, and may be mounted to the mobile device facing the same direction. When the SoC identifies two or more focus regions, such as when a user touches two or more objects in a preview display or when two or more objects are identified automatically as having high probabilities of focus interest (e.g., human faces), each of the two or more camera modules may be configured to separately maintain focus on different, assigned objects within the scene. The two or more camera modules may produce two or more corresponding preview frames having independent focus, and capture two or more corresponding images or video footage, each having independent focus. The two or more previews, images, and/or video footage may be processed according to any technically feasible focus stacking techniques to present a single image, preview, or sequence of video footage. Each of the two or more previews, images, and/or video footage may undergo an alignment procedure to be aligned with a reference perspective. Said alignment procedure may be implemented as an affine transform based on camera placement geometry within the mobile device and/or focus distance from the mobile device. In one embodiment, the affine transform is configured to generally align view frustums of the two or more camera modules. In certain embodiments, one or more images from one of the two or more camera modules serve as a reference and image data from different camera modules of the two or more camera modules is aligned and/or blended with the reference image or images to produce a real-time preview, still image, and/or video footage. The still image and/or video footage may be displayed during capture and stored for later viewing or shared for viewing at a different device.

The focus control system may be implemented within a controller (e.g., controller 333 of FIG. 3G or controller die 514 of FIG. 5) that is coupled to the image sensor, wherein both the image sensor and the controller may reside within the camera module. The controller may include a readout circuit comprising an array of analog-to-digital converter circuits (ADCs) configured to receive analog intensity signals from the image sensor and convert the analog intensity signals into a corresponding digital representation. Each pixel may include a red, green, and blue (or any other combination of color) analog intensity signal that may converted to a digital representation of red, green, and blue color intensity for the pixel. Similarly, each focus channel of each focus pixel includes at least two phase detection analog signals.

In one embodiment, each focus pixel generates two phase detection samples by integrating each of two different photodiode currents from two different photodiodes within a phase difference detection structure. A difference signal generated by subtracting one phase detection signal from the other indicates relative focus at the focus pixel. If the sign of the difference signal is positive, then the incident optical information is out of focus in one direction (e.g., focus plane is above photodiodes); if the sign is negative then the incident optical information is out of focus in the opposite direction (e.g., focus plane is below photodiodes). That is, the sign of the difference signal determines whether the camera module should adjust focus distance closer or further to achieve focus at the focus pixel. If the difference signal is below a predefined threshold, then the incident optical information may be considered to be in focus at the focus pixel.

In one embodiment, analog intensity information for the focus plane and the image plane are transmitted from an image sensor within the camera module (e.g. image sensor die 508) to a controller within the camera module (e.g., controller die 514). The controller performs analog-to-digital conversion on the analog intensity information. In such an embodiment, the difference signal at each focus pixel is computed as a digital domain subtraction or comparison operation. A digital representation of the analog intensity information may be transmitted from the controller to the SoC, or to any other technically feasible application processor. The digital representation may include image array information, focus array information, or a combination thereof.

In a different embodiment, the difference signal at each focus pixel is generated as a digital domain result of an analog domain subtraction or an analog domain comparison operation during row readout of associated focus pixels. For example, in one embodiment, an analog comparator circuit is coupled to each of two phase detection samples for a given pixel within a row. The comparator circuit may be configured to generate a digital domain "1" when the difference signal is positive and a digital domain "0" when the difference signal is negative. When the comparator output transitions from 1 to 0 or 0 to 1 in response to a focus adjustment, the focus adjustment has likely overshot an optimal focus distance. The focus control system may then may an opposite, smaller focus adjustment to converge focus. The comparator circuit may implement a specified hysteresis threshold, so that when a first fine focus adjustment causes the comparator output to transition and a second fine focus adjustment in the opposite direction does not cause a transition, then incident optical information at the focus pixel may be considered in focus because the difference signal is below the hysteresis threshold. Furthermore, a plurality of comparators may be included in either the image sensor or the controller, the plurality of comparators configured to concurrently generate difference signals for a row of focus pixels. Alternatively, using half the number of comparators, difference signals for a first half of the focus pixels may be generated and stored in a first sampling cycle and difference signals for a second half of the focus pixels may be generated and stored in a second sampling cycle. Other analog domain focus estimation techniques may also be implemented without departing the scope of embodiments disclosed herein.

More generally, the focus control system within a camera module may selectively sample digital domain difference signals to adjust focus distance for the camera module based on a given focus cost function. The digital domain difference signals may be generated using any technically feasible technique, such as the above techniques that implement a subtraction or comparison operation in either a digital or analog domain. The selective sampling may be directed by focus points, focus maps, focus regions, or any other focus specification transmitted to the controller within the camera module. Selective sampling may include sampling only certain difference signals to generate a focus estimate or multiplying each difference signal by a specified weight and generating a focus estimate from resulting multiplication products. In certain embodiments, the multiplication products may be signed.

In one embodiment, the focus control system implements a weighted sum cost function to generate a focus estimate. In such an embodiment, the focus control system may accumulate weighted focus information during frame readout. For example, during a readout time for a given row in a sequential row readout process, digital domain difference signals for each focus pixel may be multiplied by a corresponding weight associated with focus region information previously transmitted to the camera module. Each multiplication result may be added to others in the row to generate a row focus estimate, and row focus estimates for a complete frame may be added together to calculate a frame focus estimate. In certain embodiments, the frame focus estimate may be normalized to a specific range to generate a normalized frame focus estimate. For example, the normalized frame focus estimate may be calculated by multiplying the frame focus estimate by a reciprocal of the sum of focus weights. A given frame focus estimate or normalized frame focus estimate may comprise a discrete sample of a discrete time feedback signal used by the focus control system to maintain focus. In one embodiment, a lower absolute value (magnitude) for the frame focus estimate indicates better focus and a higher magnitude indicated worse focus. In general, the focus control system may be configured to minimize magnitude of the frame focus estimate.

In one embodiment, each digital difference signal is generated by a comparator configured to compare analog phase detection samples for a corresponding focus pixel as described previously. With only one comparator generating a difference signal, only focus excursions in one direction are known to produce out of focus results (e.g. positive difference signal), while focus excursions that pass through zero are not known to be in focus or out of focus in a negative direction. In such an embodiment, the focus control system may adjust focus to achieve a minimum magnitude for frame focus estimates, but avoid focus adjustments that may pass through zero to avoid overshooting focus in the negative direction.

In alternative embodiments, two comparators may be used to generate each digital difference signal, which may include two values; a first value indicates if the difference signal is positive, while the second value indicates if the difference signal is negative. The two comparators may be configured to have a known offset that is non-zero but sufficiently small to that when both comparators report a "0" output, the focus pixel may be considered to be in focus and an associated focus pixel contributes a zero value to a frame focus estimate. When one of the comparators indicates a "1" value, this 1 may be multiplied by a focus weight assigned to the focus pixel coordinate and result in a positively signed contribution to the frame focus estimate. When the other comparator indicates a "1" value, this may be multiplied by a negative of the focus weight and result in a negatively signed contribution to the frame focus estimate.

Embodiments of the present disclosure may provide a focus estimate for a frame immediately after readout for the frame completes. Immediate availability of a complete focus estimate allows the focus control system to begin adjusting focus immediately after a frame readout completes, thereby reducing perceived lags in focus tracking. Furthermore, with the focus control system implemented on the controller within the camera module, less overall system power consumption may be necessary to maintain a specific focus response time as less data needs to be transmitted to the SoC for focus maintenance. By contrast, conventional systems require additional time and power consumption to maintain focus. For example, a conventional system typically transmits frames of image data, potentially including focus pixel data, to a conventional SoC, which then processes the image data to generate a focus estimate; based on the focus estimate, the conventional SoC then calculates an updated focus distance target and transmits the updated focus target to a conventional camera module, which receives the focus distance target and executes a focus adjustment. These conventional steps generally require more power consumption (reduced device battery life) and more execution time (increased focus lag) than embodiments disclosed herein.

In one embodiment, focus weight values are quantized as having a value of 0 or 1, so that any focus pixel within a focus region provides an equal contribution to a focus estimate and focus weights outside a focus region contribute a zero weight. Such a quantization of focus weights provides a relatively compact representation of a focus map, focus point, list of focus points, and the like. In other embodiments focus weight values are quantized to include multiple levels, which may include a weight of 0, a weight of 1, and weights between 0 and 1. In yet other embodiments, different quantization ranges may be implemented, including, without limitation, quantization ranges specified by fixed-point and/or floating-point representation.

A focus map may specify a 2D array of focus weights to be applied by the focus control system within the camera module when generating a focus estimate for maintaining focus. Each focus weight of the 2D array of focus weights may be mapped to a corresponding pixel location for the image sensor. In one embodiment, each focus weight of the 2D array of focus weights corresponds to a focus pixel within the image sensor in a one-to-one correspondence. In another embodiment, the 2D array of focus weights comprises a lower resolution set of focus weights than available focus pixels and focus weights for each focus pixel may be calculated by interpolation between focus weights specified by the 2D array of focus weights. Such interpolation may produce fractional or binary (1 or 0) focus weights used in conjunction with focus pixel digital domain difference signals to generate a focus estimate.

The focus point may comprise focus target information (e.g. coordinates) used to select a focus pixel within the image sensor. The focus point may define a location between focus points, and an appropriate fractional focus weight may be applied by the controller to two or four focus pixels bounding the location. Furthermore, the focus point may include a radius forming a geometric region (e.g., circle, square, etc.) about the focus point. Focus pixels within the geometric region may be assigned non-zero focus weights. The non-zero focus weights may be assigned 1, or a fractional value, such as according to a weight profile. A focus point list may include a list of coordinates, each operable as a focus point, with a focus estimate calculated over regions associated with the focus points in the list of focus points.

In certain embodiments, the camera module may provide a variable focus plane orientation so that the focus plane may be tilted. In one embodiment, a tilt lens comprising the camera module lens assembly may include two or more actuators configured to move at least one optical element into an arbitrary orientation relative to conventional planar alignment of optical elements in an optical path. For example, an optical element may be coupled to three independent actuators configured to position the optical element according to a specified plane orientation, which may be non-planar relative to other optical elements. As such, the lens assembly may implement focus operations analogous to that of a conventional tilt lens. However, in one embodiment, when two or more focus regions are specified, the camera module may orient the optical element (focus plane) to achieve focus over the two or more focus regions. For example, when two or more people are standing within a plane that is not normal to the camera module lens assembly, the focus plane may be tilted to include people at each focus extreme, thereby allowing the camera module to capture an image of the people with everyone generally in focus.

In one embodiment, determining focus information in video may include receiving location coordinate(s) associated with a first image frame, sending the coordinate(s) to camera module, and adjusting the focus associated with the coordinate(s) to a second (or subsequent) image frame. In this manner, focus information as determined for one image frame may be applied to one or more subsequent frames.

Still yet, in one embodiment, identifying an object (e.g. by the SoC) may include one or more triggers. For example, a trigger may include a movement, a sound, a disparity (e.g. change in color, brightness, intensity), etc. In one embodiment, such a trigger may be applied to security applications. For example, a security camera may be pointed to a scene, but the recording of the scene may be initiated based on satisfying a trigger (e.g. movement) as detected within the scene. Once movement is detected, then the SoC may track the moving object and send the corresponding coordinates to the camera module to adjust the focus.

Additionally, in another embodiment, once an object has been identified, then intelligent zoom may be enabled. For example, if movement has been detected, coordinates associated with the moving object may be captured and sent to the camera module which may the adjust the focus as well as automatically increase/decrease the zoom on the identified object. For example, in one embodiment, the SoC may determine that the moving object is a region of pixels. The camera module may zoom into an area immediately surrounding but encompassing the identified region of pixels by the SoC.

Still yet, in one embodiment, use of the SoC to identify and/or track objects and use of the camera module to adjust the focus, may also relate to multiple devices. For example, in one embodiment, a collection of drones may be used to track and focus on the same object. Additionally, images that are captured through use of such a system would allow for multiple angles and/or perspectives and/or zoom of the same object. Such a collection of aggregated images would also allow for augmented or virtual reality systems.

Further, use of such a system would allow for clearer immersive 360 degree capture and/or panoramic scenes, wherein multiple images may be stitched together in a manner where surrounding objects have a consistent focus. Additionally, in one embodiment, such a capture may also allow modifying the brightness, intensity, frame rate, film speed, so that when the images are stitched together, blurring and distortions are minimized between one image and another. As such, more effective focusing during capture may allow for more efficient post-processing work for captured images.

Still yet, in one embodiment, sweeping a scene with multiple focus points may allow for user-defined focus points during post-processing. For example, a scene with multiple objects may be swept such that the focus for each identified object may be captured. An image set of all captured images may be compiled for the photographic scene such that during post-processing, a user may define a point of focus and readjust the photo (after capture) to account for the change in focus.

Figure 11:
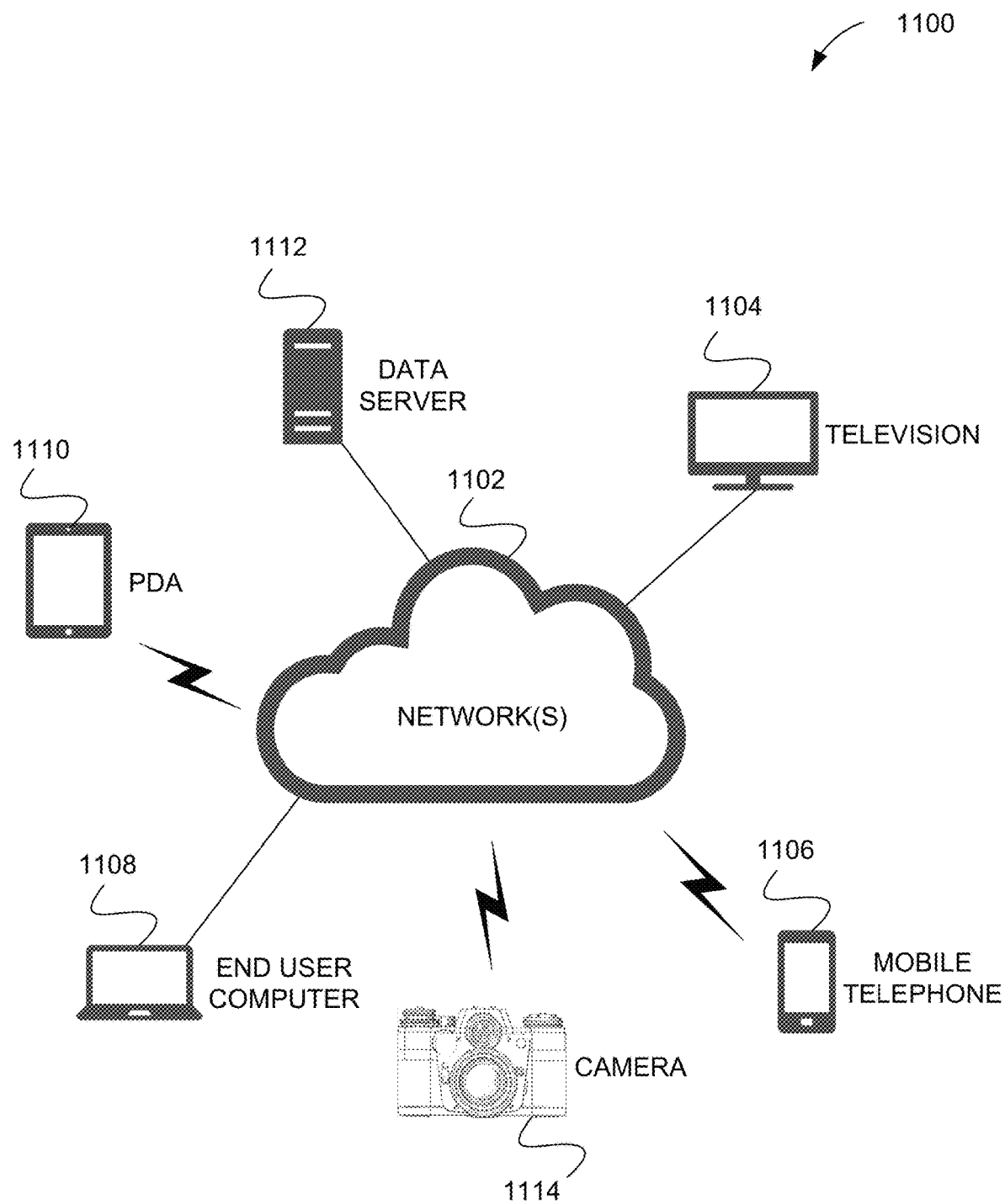
FIG. 11 illustrates a network architecture, in accordance with one possible embodiment.

FIG. 11 illustrates a network architecture 1100, in accordance with one possible embodiment. As shown, at least one network 1102 is provided. In the context of the present network architecture 1100, the network 1102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1102 may be provided.

Coupled to the network 1102 is a plurality of devices. For example, a server computer 1112 and an end user computer 1108 may be coupled to the network 1102 for communication purposes. Such end user computer 1108 may include a desktop computer, lap-top computer, and/or any other type of logic. Still yet, various other devices may be coupled to the network 1102 including a personal digital assistant (PDA) device 1110, a mobile phone device 1106, a camera 1114, a television 1104, etc. In various embodiments, any of the devices shown (e.g., PDA 1110, end user computer 1108, camera 1114, mobile telephone 1106, etc) may include one or more camera modules configured to implement various aspects of the present disclosure.

Still yet, in various embodiments, one or more of the techniques disclosed herein may be applied to a variety of markets and/or products. For example, although the techniques have been disclosed in reference to a photo capture, they may be applied to televisions, web conferencing (or live streaming capabilities, etc.), security cameras (e.g. increase contrast to determine characteristic, etc.), automobiles (e.g. driver assist systems, in-car infotainment systems, etc.), and/or any other product which includes a camera input.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A device, comprising:
 a camera module, comprising:
  an image sensor, configured to convert a first optical scene information to a first electrical representation and convert a second optical scene information to a second electrical representation, wherein the first electrical representation includes first focus pixel information and the second electrical representation includes second focus pixel information;

a lens assembly, configured to adjust focus of the first optical scene information based on a first focus control signal and adjust focus of the second optical scene information based on a second focus control signal;

a controller, coupled to the image sensor and the lens assembly, and configured to continuously generate the first focus control signal based on the first focus pixel information and a first focus target information, and the second focus control signal based on the second focus pixel information and a second focus target information, and to transmit the first focus control signal and the second focus control signal to the lens assembly;

a camera interconnect, coupled to the controller and to an application processor, wherein the application processor is in communication with at least one non-transitory memory, wherein the application processor executes the instructions to:

identify a first focus region of the first focus pixel information, using an image classifier, wherein the image classifier identifies or tracks a first set of objects within the first optical scene information;

identify a second focus region of the second focus pixel information, using the image classifier, wherein the image classifier identifies or tracks a second set of objects within the second optical scene information;

generate the first focus target information corresponding to the first focus region;

transmit the first focus target information to the controller through the camera interconnect;

generate the second focus target information corresponding to the second focus region;

transmit the second focus target information to the controller through the camera interconnect.

2. The device of claim 1, wherein the application processor is configured to:

align a first image associated the first optical scene information and a second image associated with the second optical scene information; and blend the first image and the second image to create a first blended image.

3. The device of claim 2, wherein the device is configured such that the first focus target information is saved as metadata associated with the first image, and the second focus target information is saved as metadata associated with the second image.

4. The device of claim 2, wherein the controller is configured to receive a third focus target information, the third focus target information found between the first focus target information and the second focus target information.

5. The device of claim 4, wherein the device is configured such that the first focus target information corresponds with a first focus setting, the second focus target information corresponds with a second focus setting, and the third focus target information corresponds with a third focus setting.

6. The device of claim 5, wherein the device is configured such that the first focus setting is used to capture the first image, the second focus setting is used to capture the second image, and the third focus setting is used to capture a third image, wherein the at least one first image, the at least one second image, and the third image are blended to create a second blended image.

7. The device of claim 2, wherein the device is configured such that blending the first image and the second image is based on at least one of focus stacking, focal plane merging, z-stacking, and focus blending.

8. The device of claim 2, wherein the device is configured such that the first blended image preserves the first focus target information and the second focus target information such that the first focus region or the second focus region may be later selected to readjust a point of focus.

9. The device of claim 1, wherein the device is configured such that the first focus region and the second focus region each include one or more pixel points with a radius and weight profile.

10. The device of claim 9, wherein the device is configured such that the weight profile includes a start point and an end point, with a predefined function to be applied between the start point and the end point.

11. The device of claim 1, wherein the device is configured such that the first focus region and the second focus region each include one or more pixel points with a weight mask.

12. The device of claim 11, wherein the device is configured such that one or more weights associated with the weight mask are used to establish a focus estimate.

13. The device of claim 1, wherein the device is configured such that first information from one or more focus pixels associated with the first focus region is aggregated to generate a first focus estimate for the first focus region, the first focus estimate based on the first focus target information, and second information from one or more focus pixels associated with the second focus region is aggregated to generate a second focus estimate for the second focus region, the second focus estimate based on the second focus target information.

14. The device of claim 1, wherein the device is configured such that the first focus target information and the second focus target information each include a 2D mask of values.

15. The device of claim 1, wherein the device is configured such that the first focus target information and the second focus target information each includes at least one coordinate corresponding to one or more pixel points.

16. The device of claim 1, wherein the device is configured such that at least one of the first focus target information and the second focus target information is selected by a user.

17. The device of claim 1, wherein the controller is configured to capture at least one first image based on the first optical scene information and capture at least one second image based on the second optical scene information.

18. The device of claim 1, wherein the first set of objects is equal to the second set of objects.

19. The device of claim 1, wherein the first set of objects is different from the second set of objects.

20. A computer-implemented method, comprising:

receiving, using a controller coupled to an image sensor and a lens assembly, a first focus target information, wherein the image sensor is configured to convert a first optical scene information to a first electrical representation and convert a second optical scene information to a second electrical representation, the first electrical representation includes first focus pixel information and the second electrical representation includes second focus pixel information, and wherein the lens assembly is configured to adjust focus of the first optical scene information based on a first focus control signal and adjust focus of the second optical scene information based on a second focus control signal;

continuously generating, by the controller, the first focus control signal based on the first focus target information and the first focus pixel information;

transmitting, using the controller, the first focus control signal to the lens assembly;

receiving, using the controller, a second focus target information;

continuously generating, using the controller, the second focus control signal based on the second focus target information and the second focus pixel information;

transmitting, using the controller, the second focus control signal to the lens assembly;

identifying, using an application processor, a first focus region of the first focus pixel information using an image classifier, wherein the image classifier identifies or tracks a first set of objects within the first optical scene information;

generating, using the application processor, the first focus target information corresponding to the first focus region;

transmitting, using the application processor, the first focus target information to the controller through a camera interconnect;

identifying, using the application processor, a second focus region of the second focus pixel information using the image classifier, wherein the image classifier identifies or tracks a second set of objects within the second optical scene information;

generating, using the application processor, the second focus target corresponding to the second focus region; and transmitting, using the application processor, the second focus target information to the controller through the camera interconnect.

\* \* \* \* \*